US012746721B2

(12) United States Patent
Reeves-Hall

(10) Patent No.: US 12,746,721 B2
(45) Date of Patent: Sep. 29, 2026

(54) CONTROL OF ADDITIVE MANUFACTURING SYSTEMS INCLUDING MULTIPLE LASER ENERGY SOURCES

(71) Applicant: VulcanForms Inc., Devens, MA (US)

(72) Inventor: Peter Colin Reeves-Hall, Whitinsville, MA (US)

(73) Assignee: VulcanForms Inc., Devens, MA (US)

( * ) Notice: Subject to any disclaimer, the term of this patent is extended or adjusted under 35 U.S.C. 154(b) by 346 days.

(21) Appl. No.: 18/524,444

(22) Filed: Nov. 30, 2023

(65) Prior Publication Data

US 2024/0181709 A1 Jun. 6, 2024

Related U.S. Application Data

(60) Provisional application No. 63/429,228, filed on Dec. 1, 2022.

(51) Int. Cl.

| | |
|---|---|
| ***B29C 64/386*** | (2017.01) |
| ***B29C 64/268*** | (2017.01) |
| ***B33Y 30/00*** | (2015.01) |
| ***B33Y 50/00*** | (2015.01) |
| *B23K 31/12* | (2006.01) |

(52) U.S. Cl.

CPC .......... *B29C 64/386* (2017.08); *B29C 64/268* (2017.08); *B33Y 30/00* (2014.12); *B33Y 50/00* (2014.12); *B23K 31/125* (2013.01)

(58) Field of Classification Search

CPC .......... B22F 10/36; B22F 12/41; B22F 12/45; B29C 64/268

See application file for complete search history.

(56) References Cited

U.S. PATENT DOCUMENTS 9,956,612 B1 5/2018 Redding et al.
10,022,795 B1 7/2018 Redding et al.

(Continued)

FOREIGN PATENT DOCUMENTS

CN 1680187 A * 2/2005 ............... B05D 1/00
CN 101762894 B * 10/2011

(Continued)

OTHER PUBLICATIONS

International Search Report and Written Opinion mailed Apr. 10, 2024 in connection with International Application No. PCT/US2023/081729.

(Continued)

*Primary Examiner* — Redhwan K Mawari

(74) *Attorney, Agent, or Firm* — Wolf, Greenfield & Sacks, P.C.

(57) ABSTRACT

Additive manufacturing systems and methods related to the selection and use of groups of laser pixels from an array of laser pixels including a plurality of laser pixels are disclosed. According to some embodiments a plurality of laser pixels may be divided into one or more groups of laser pixels based on one or more process parameters and/or based on the identification of failed laser pixels. The groups may be include fewer laser pixels than the overall array of laser pixels. In some embodiments, an additive manufacturing system may switch between laser pixel groups during a manufacturing process to provide redundancy and/or to enable continued operation of the system even when laser pixel failures occur.

50 Claims, 19 Drawing Sheets

(56) References Cited

U.S. PATENT DOCUMENTS

| | | | | |
|---|---|---|---|---|
| 10,112,260 | B2 | 10/2018 | Crear et al. | |
| 10,336,008 | B2 | 7/2019 | Perret et al. | |
| 10,611,092 | B2 | 4/2020 | Buller et al. | |
| 10,882,256 | B1 | 1/2021 | Thiel | |
| 10,919,218 | B2 | 2/2021 | Mamrak et al. | |
| 11,325,207 | B2 | 5/2022 | Carter | |
| 11,389,877 | B2 | 7/2022 | Buhr | |
| 2016/0158889 | A1 | 6/2016 | Carter et al. | |
| 2016/0368050 | A1 | 12/2016 | Morris et al. | |
| 2017/0021455 | A1 | 1/2017 | Dallarosa et al. | |
| 2017/0056975 | A1 | 3/2017 | Carter et al. | |
| 2017/0101496 | A1* | 4/2017 | Desmet | B41C 1/1016 |
| 2017/0363741 | A1* | 12/2017 | Send | G01S 7/4816 |
| 2018/0200792 | A1 | 7/2018 | Redding et al. | |
| 2018/0207722 | A1 | 7/2018 | Feldmann et al. | |
| 2018/0233420 | A1* | 8/2018 | Rapoport | H10P 74/207 |
| 2018/0236549 | A1 | 8/2018 | Spears et al. | |
| 2019/0143406 | A1 | 5/2019 | Carter et al. | |
| 2019/0163172 | A1 | 5/2019 | Daniel et al. | |
| 2019/0299286 | A1* | 10/2019 | Feldmann | B23K 26/342 |
| 2020/0039000 | A1 | 2/2020 | Sweetland | |
| 2020/0086388 | A1* | 3/2020 | Zediker | B23K 26/032 |
| 2020/0108465 | A1 | 4/2020 | Sweetland | |
| 2020/0230745 | A1 | 7/2020 | Komsta et al. | |
| 2020/0355801 | A1* | 11/2020 | Schaller | H01S 5/02255 |
| 2020/0376761 | A1 | 12/2020 | Sweetland | |
| 2021/0146624 | A1* | 5/2021 | Mattes | B33Y 10/00 |
| 2021/0339318 | A1 | 11/2021 | Dunbar et al. | |
| 2022/0009030 | A1 | 1/2022 | Dadelszen et al. | |
| 2022/0080668 | A1 | 3/2022 | Graf et al. | |
| 2022/0371094 | A1 | 11/2022 | Bhattad et al. | |
| 2023/0056367 | A1 | 2/2023 | Leonardo et al. | |

FOREIGN PATENT DOCUMENTS

| | | | | | |
|---|---|---|---|---|---|
| CN | 106459296 | A | * | 2/2017 | G03F 7/004 |
| CN | 111373278 | A | * | 7/2020 | H01S 5/4012 |
| CN | 114137548 | A | * | 3/2022 | G01S 7/4863 |
| DE | 10-2020-200599 | A1 | | 7/2021 | |
| EP | 3 521 028 | A1 | | 8/2019 | |
| JP | 2011031552 | A | * | 2/2011 | G01B 11/00 |
| WO | WO 2019/161886 | A1 | | 8/2019 | |
| WO | WO 2019/173000 | A1 | | 9/2019 | |
| WO | WO 2021/224099 | A1 | | 11/2021 | |
| WO | WO 2025/006255 | A2 | | 1/2025 | |

OTHER PUBLICATIONS

Zhao et al. Real-time interferometric monitoring and measuring of photopolymerization based stereolithographic additive manufacturing process: sensor model and algorithm. Measurement Science and Technology. 2017;28(1):015001, 23 pages. Published Nov. 18, 2016. DOI: 10.1088/0957-0233/28/1/015001.

* cited by examiner

CONTROL OF ADDITIVE MANUFACTURING SYSTEMS INCLUDING MULTIPLE LASER ENERGY SOURCES

RELATED APPLICATION

This application claims priority under 35 U.S.C. § 119(e) to U.S. Provisional Application No. 63/429,228, filed Dec. 1, 2022, the content of which is incorporated by reference in its entirety for all purposes.

FIELD

Disclosed embodiments are generally related to control of additive manufacturing systems including multiple laser energy sources.

BACKGROUND

Additive manufacturing systems employ various techniques to create three-dimensional objects from two-dimensional layers. After a layer of precursor material is deposited onto a build surface, a portion of the layer may be fused through exposure to one or more energy sources, such as laser energy sources, to create a desired two-dimensional geometry of solidified material within the layer. Next, the build surface may be indexed, and another layer of precursor material may be deposited. For example, in conventional systems, the build surface may be indexed downwardly by a distance corresponding to a thickness of a layer. This process may be repeated layer-by-layer to fuse many two-dimensional layers into a three-dimensional object.

SUMMARY

According to some aspects, an additive manufacturing system comprises a build surface, a plurality of laser energy sources, and an optics assembly configured to direct laser energy from the one or more laser energy sources toward the build surface to form a corresponding plurality of laser pixels on the build surface. At least one processer is configured to identify one or more groups of contiguous viable laser pixels of the plurality of laser pixels and to select a group of the one or more groups of contiguous viable laser pixels. The processor is configured to form one or more parts on the build surface using the selected group of contiguous viable laser pixels.

According to other aspects, a method for operating an additive manufacturing system is provided. The method comprises identifying one or more groups of contiguous viable laser pixels of the plurality of laser pixels, selecting a group of the one or more of contiguous viable laser pixels, and forming one or more parts on the build surface using the selected group of contiguous viable laser pixels. According to some aspects, a non-transitory computer readable medium including processor executable instructions are provided that when executed by one or more processors will perform the method for operating the additive manufacturing system.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Other advantages and novel features of the present disclosure will become apparent from the following detailed description of various non-limiting embodiments of the disclosure when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
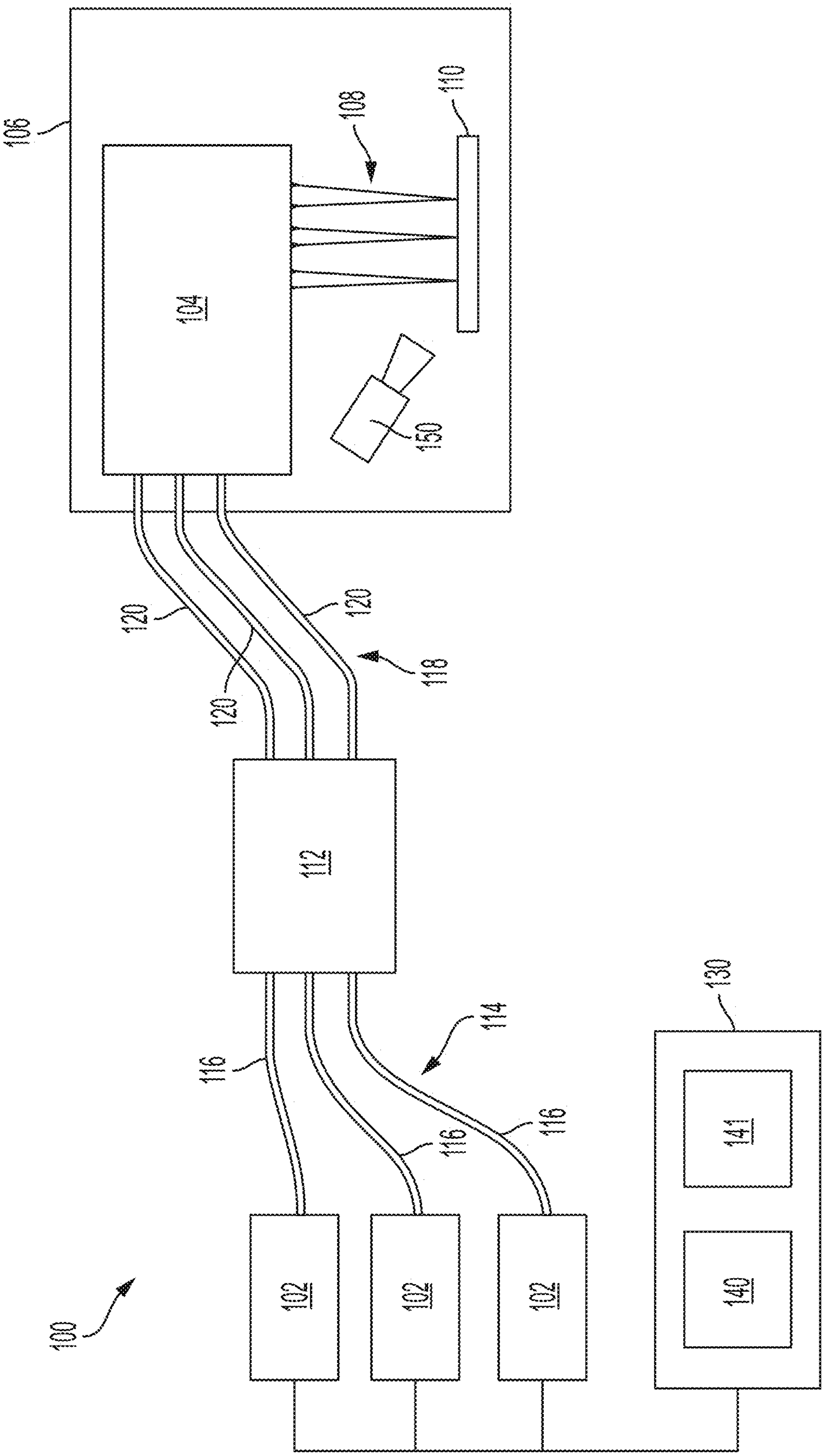
FIG. 1 shows a schematic representation of an additive manufacturing system according to some embodiments.

Some additive manufacturing processes may use a plurality of laser energy sources to form a corresponding plurality of laser pixels on a build surface of an additive manufacturing system. The plurality of laser pixels may weld, sinter, react, or otherwise fuse a precursor material disposed on a build surface; the precursor material may be a metallic, ceramic, polymer, and/or composite powder in some embodiments. The plurality of laser pixels may be arranged in an array in regular pattern such that the individually controllable laser pixels may be used to fuse the precursor material as the plurality of laser pixels are traversed relative to the build surface during formation of one or more parts. However, the Inventors have recognized that as the number of laser energy sources increase and as the powers applied by these laser energy sources increase, the likelihood of a failure of one or more laser pixels either prior to and/or during a printing process increases. This is especially likely when multi-day print processes are performed. While these failures may correspond to complete failure of a laser pixel other types of laser pixel failures may also be present as elaborated on further below.

In view of the above, rather than abandoning a printing process in instances in which a laser pixel failure is detected, the Inventors have recognized that it may be desirable to form one or more parts during an additive manufacturing process using a number of laser pixels that are less than the total number of laser pixels present in a laser pixel array of an additive manufacturing system in some embodiments. Laser pixels that may be selected for use during the manufacturing process may include a sub-set of the laser pixels included in the laser pixel array corresponding to one or more groups of contiguous viable laser pixels. Additionally, in some embodiments, it may be desirable to monitor whether or not any of the currently selected contiguous viable laser pixels in the additive manufacturing system fail either before and/or during a manufacturing operation. In instances in which a laser pixel failure in a currently selected group is detected, the additive manufacturing system may switch operation from the selected group of contiguous viable laser pixels to a different group of contiguous viable laser pixels for performing the desired manufacturing process.

In some embodiments an additive manufacturing system may identify one or more groups of contiguous viable laser pixels within an array of laser pixels that are formed by a corresponding plurality of laser energy sources. A group of contiguous viable laser pixels may be selected from the identified groups based on one or more process parameters as elaborated on further below. Identification and group selection may occur prior to or during a manufacturing process as also elaborated on further below.

As used herein, a group of contiguous laser pixels may correspond to a grouping of laser pixels where each laser pixel within the group may be disposed adjacent to at least one other laser pixel in the group. Stated in another way, a group of contiguous laser pixels may be arranged in an overall laser pixel array such that pixels that are not part of the group are not disposed between two or more laser pixels of the group.

Identification of failed laser pixels may be based on a number of considerations. For example, laser pixel failure may be determined using parameters including laser intensity, data from the laser energy sources, and by proximity to other failed laser pixels as well as by observation of material fused by the laser pixels. For example, in some cases, a failed optical path may result in an optical fiber burning from a defect downstream toward the laser energy source which may be observed by the laser energy source which may shut off and output a failure signal. The failure signal may be received by a controller of the additive manufacturing system. In other cases failures within a laser source may be manifest as unstable power, voltage spikes, failure to reach commanded intensity, heating or other indications of failure. Observation of poor weld quality and/or weld defects may be identified using one or more appropriate sensor such as one or more weld quality cameras, thermal sensors, and/or other appropriate weld quality sensors configured to identify improper weld formation due to laser pixel failures. In such an embodiment, the welds exhibiting weld defects may be correlated with a corresponding laser energy source based on the position of the weld defects on the build surface and an associated build plan. For example, failed welds may include lack of fusion or no melt pool formation as well as changes in melt pool size, spatter asymmetry, and/or other inconsistencies. In some cases the weld quality monitor may detect these problems before a laser pixel fails completely and/or before the reduced performance would result in a non-conforming part. Thus, while the laser pixel is still partially functioning, it may still be considered to be a failed pixel as it is not forming welds of acceptable quality. However, while examples of pixel failures and methods of identifying such failures have been provided above, it should be understood that the current disclosure is not limited to identifying failed laser pixels using only these methods and that other methods of identifying failed laser pixels are also contemplated. Additionally, failed laser pixels may be identified prior to the start of printing and/or at intervals throughout a printing process (e.g., during formation of one or more individual build layers).

The specific type of additive manufacturing system being used; the types, number, and layout of different parts being manufactured; and other considerations may influence the selection of a desired size for the one or more pixel groups of contiguous viable laser pixels for use during a build process. As used herein, a size of a pixel group may refer to a number of laser pixels within the group. Selecting the laser pixel group size may be a balance between printing speed and redundancy of the process along with other considerations. Thus, in some embodiments, selection of a laser pixel group size may be determined at least in part by one or more of the following process parameters: number of pixel groups of contiguous viable laser pixels with a higher laser pixel count than a candidate pixel group; number of redundant pixel groups with the same laser pixel count as a candidate pixel group; number of pixel groups of contiguous viable laser pixels with a lower laser pixel count than a candidate pixel group; time left on print; time spent on print; time saved by selecting a larger pixel group; time lost by selecting a smaller pixel group; time required to switch between laser pixel groups; the value of print; the cost of a print; process requirements for a print; machine availability; power availability; probability of laser pixel failure during print; a laser intensity of each laser pixel; locations of failed laser pixels; measurements of weld quality; measurements of laser calibration; measurements of contamination on laser optics; service history and runtime on a particular laser pixel; and/or any other appropriate process parameter. Without wishing to be bound by theory, pixel groups containing fewer laser pixels may have higher reliability and greater redundancy but may also have a slower print time as compared to pixel groups including larger numbers of laser pixels.

Laser pixel group sizes may include any appropriate number of laser pixels depending on a desired application. For example, laser pixel groups may include greater than or equal to 2, 4, 8, 16, 32, 64, 128 and/or any other appropriate number of laser pixels. The laser pixels groups may also include less than or equal to 128, 64, 32, 16, and/or any other appropriate number of laser pixels. Combinations of the foregoing may be used including, for example, a number of laser pixels included in a pixel group that is between or equal to 2 and 128, 2 and 64, or other appropriate combinations. Of course, ranges different than those noted above and less than a total number of laser pixels included in a system may be used as the disclosure is not limited to any specific number of laser pixels included in a group.

According to some embodiments, the methods and systems disclosed herein may be utilized in powder bed fusion additive manufacturing processes and systems. These additive manufacturing systems may include a plurality of energy sources, such as a plurality of laser energy sources with corresponding laser pixels formed on a build surface. However, uses with other types of additive manufacturing processes are also contemplated. Such uses may include any additive manufacturing system or other system using a plurality of laser energy sources to melt, sinter, react, or otherwise fuse a precursor material. For example, the precursor material may be a polymer, a metal, a ceramic, or composites including at least one of the above. Other appropriate types of additive manufacturing process may include, but are not limited to, stereolithography (SLA), and/or any other appropriate process where multiple lasers pixels included in an array are used to fuse a precursor material. Of course, uses in laser cutting, ablating, machining, or drilling using arrays of laser energy sources are also contemplated.

According to some embodiments, the techniques disclosed herein may increase the reliability of additive manufacturing processes. As a result of better detection and a more rapid switchover between different laser pixel groups fewer parts may be lost, abandoned, or scrapped. Fewer flaws and better part quality may also result in some embodiments. Shorter build times may result from better management of laser pixel group redundancy as well as from more rapid laser pixel group switchover. Correspondingly, shorter build times may result in greater throughput from a fixed number of machines with a lower scrape rate. Of course, other benefits in addition to or in place of those noted above may also be provided by the disclosed systems and methods.

In some embodiments, incident laser pixels on a build surface may be arranged in a linear array with a long dimension and a short dimension, or in a two dimensional array. In either case, according to some aspects, an array of laser energy sources may be configured to emit a corresponding array of individual laser pixels arranged adjacent to each other on a build surface. The separate laser energy sources may be individually controlled such the power levels of each laser pixel may be individually controlled. For example, each laser pixel may be turned on or turned off independently and the power of each laser pixel can be independently controlled. The resulting laser pixel-based line or array may also be scanned across a build surface to form a desired pattern thereon by controlling the individual laser pixels during translation of an optics assembly as detailed further below. In addition to the above, it should be understood that the selection, grouping, and operation of laser pixels may be synonymous with the selection, grouping, and operation of the corresponding laser energy sources that are configured to form the noted laser pixels. Therefore, these terms may be used interchangeably with one another where appropriate in the following description.

Depending on the particular embodiment, an additive manufacturing system according to the current disclosure may include any suitable number of laser energy sources. For example, in some embodiments, the number of laser energy sources may be at least 5, at least 10, at least 50, at least 100, at least 500, at least 1,000, at least 1,500, or more. In some embodiments, the number of laser energy sources may be less than 2,000, less than 1,500, less than 1,000, less than 500, less than 100, less than 50, or less than 10. Additionally, combinations of the above-noted ranges may be suitable. Ranges both greater and less than those noted above are also contemplated as the disclosure is not so limited.

Additionally, in some embodiments, a power output of a laser energy source (e.g., a laser energy source of a plurality of laser energy sources) may be between about 50 W and about 2,000 W (2 kW). For example, the power output for each laser energy source may be between about 100 W and about 1.5 KW, and/or between about 500 W and about 1 kW. Moreover, a total power output of the plurality of laser energy sources may be between about 500 W (0.5 KW) and about 4,000 kW. For example, the total power output may be between about 1 kW and about 2,000 kW, and/or between about 100 kW and about 1,000 kW. Ranges both greater and less than those noted above are also contemplated as the disclosure is not so limited.

Depending on the embodiment, an array of laser pixels (e.g., a line array or a two dimensional array) may have a uniform power density along one or more axes of the array including, for example, along the length dimension (i.e. the longer dimension) of a line array. In other instances, an array can have a non-uniform power density along either of the axes of the array by setting different power output levels for each laser pixel's associated laser energy source. Moreover, individual laser pixels on the exterior portions of the array can be selectively turned off or on to produce an array with a shorter length and/or width. In some embodiments, the power levels of the various laser pixels in an array of laser energy may be independently controlled throughout an additive manufacturing process. For example, the various laser pixels may be selectively turned off, on, or operated at an intermediate power level to provide a desired power density within different portions of the array.

Generally, laser energy produced by a laser energy source has a power area density. In some embodiments, the power area density of the laser energy transmitted through an optical fiber is greater than or equal to 0.1 W/micrometer$^2$, greater than or equal to 0.2 W/micrometer$^2$, greater than or equal to 0.5 W/micrometer$^2$, greater than or equal to 1 W/micrometer$^2$, greater than or equal to 1.5 W/micrometer$^2$, greater than or equal to 2 W/micrometer$^2$, or greater. In some embodiments, the power area density of the laser energy transmitted through the optical fiber is less than or equal to 3 W/micrometer$^2$, less than or equal to 2 W/micrometer$^2$, less than or equal to 1.5 W/micrometer$^2$, less than or equal to 1 W/micrometer$^2$, less than or equal to 0.5 W/micrometer$^2$, less than or equal to 0.2 W/micrometer$^2$, or less. Combinations of these ranges are possible. For example, in some embodiments, the power area density of the laser energy transmitted through the optical fiber is greater than or equal to 0.1 W/micrometer$^2$ and less than or equal to 3 W/micrometer$^2$.

Depending on the application, output of the optics assembly may be scanned across a build surface of an additive manufacturing system in any appropriate fashion. For example, in one embodiment, one or more galvo scanners may be associated with one or more laser energy sources to scan the resulting one or more laser pixels across the build surface. Alternatively, in other embodiments, an optics assembly may include an optics head that is associated with one or more appropriate actuators configured to translate the optics head in a direction parallel to a plane of the build surface to scan the one or more laser pixels across the build surface. In either case, it should be understood that the disclosed systems and methods are not limited to any particular construction for scanning the laser energy across a build surface of the additive manufacturing system.

For the sake of clarity, transmission of laser energy through an optical fiber is described generically throughout. However, with respect to various parameters such as transverse cross-sectional area, transverse dimension, transmission area, power area density, and/or any other appropriate parameters related to a portion of an optical fiber that the laser energy is transmitted through, it should be understood that these parameters refer to either a parameter related to a bare optical fiber and/or a portion of an optical fiber that the laser energy is actively transmitted through such as an optical fiber core, or a secondary optical laser energy transmitting cladding surrounding the core. In contrast, any surrounding cladding, coatings, or other materials that do not actively transmit the laser energy may not be included in the disclosed ranges.

As used herein, an operation, state, or other concept used in reference to a laser pixel should be understood to refer to the laser energy source associated with that laser pixel as well. For example, if a laser pixel is experiencing a failure this may refer to a failure state of the laser energy source and optics used to form that laser pixel. Similarly, operation of a laser pixel to fuse a precursor material may be understood to refer to operation of the laser energy source to emit a laser beam and form the laser pixel on a desired portion of a build surface.

It will be appreciated that any embodiments of the systems, components, methods, and/or programs disclosed herein, or any portion(s) thereof, may be used to form any part suitable for production using additive manufacturing. For example, a method for additively manufacturing one or more parts may, in addition to any other method steps disclosed herein, include the steps of selectively fusing one or more portions of a plurality of layers of precursor material deposited onto the build surface to form the one or more parts. This may be performed in a sequential manner where each layer of precursor material is deposited on the build surface and selected portions of the upper most layer of precursor material is fused to form the individual layers of the one or more parts. This process may be continued until the one or more parts are fully formed.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows, according to some embodiments, a schematic representation of an additive manufacturing system 100, including a plurality of laser energy sources 102 that deliver laser energy to an optics assembly 104 positioned within a machine enclosure 106. For example, the machine enclosure may define a build volume in which an additive manufacturing process may be carried out. In particular, the optics assembly may direct laser energy 108 towards a build surface 110 positioned within the machine enclosure to selectively fuse powdered material on the build surface. As described in more detail below, the optics assembly 104 may include a plurality of optics defining an optical path within the optics assembly that may transform, shape, and/or direct laser energy within the optics assembly such that the laser energy is directed onto the build surface as an array of laser pixels. In some embodiments, the optics assembly may be movable within machine enclosure 106 to scan laser energy 108 across build surface 110 during a manufacturing process. For example, the optics assembly may be associated with appropriate actuators, rails, motors, and/or any other appropriate structure capable of moving the optics assembly relative to the surface. Alternatively, embodiments in which the optics assembly includes galvomirrors or other appropriate components that are configured to scan the laser energy 108 across the build surface while the optics assembly is held stationary relative to the build surface are also contemplated.

In some embodiments, the additive manufacturing system 100 further includes one or more optical fiber connectors 112 positioned between the laser energy sources 102 and the optics assembly 104. As illustrated, a first plurality of optical fibers 114 may extend between the plurality of laser energy sources 102 and the optical fiber connector 112. In particular, each laser energy source 102 may be coupled to the optical fiber connector 112 via a respective optical fiber 116 of the first plurality of optical fibers 114. Similarly, a second plurality of optical fibers 118 extends between the optical fiber connector 112 and the optics assembly 104. Each optical fiber 116 of the first plurality of optical fibers 114 is coupled to a corresponding optical fiber 120 of the second plurality of optical fibers 118 within the optical fiber connector. In this manner, laser energy from each of the laser energy sources 102 is delivered to the optics assembly 104 such that laser energy 108 can be directed onto the build surface 110 during an additive manufacturing process (i.e., a build process). Of course other methods of connecting the laser energy sources 102 due to the optics assembly 104 are also contemplated.

The additive manufacturing system further includes a controller 130 including one or more processors 140 and non-transitory computer readable memory 141. The controller may direct aspects of the additive manufacturing system including operation of the laser energy sources and associated movement stages to control the formation of one or more parts on the build surface. For example, processor executable instructions stored in the memory may be executed by the controller to perform any of the methods disclosed herein. The additive manufacturing system may further include a weld quality sensor 150 which may comprise one or more photosensitive detectors (e.g., a camera) or other appropriate weld quality sensors as described above. The weld quality sensor may be configured to provide images or other appropriate information to the controller for determining a weld quality of weld tracks formed by the plurality of lasers on the build surface during a part formation process. In some embodiments, the controller may interpret the images to quantify weld quality and for the purpose of identifying failed or failing laser pixels as elaborated below. Of course the inclusion and use of other sensors for measuring any of the disclosed parameters herein is also contemplated including, for example, encoders, temperature sensors, displacement sensors, distance sensors, photosensitive detectors, current sensors, and/or any other appropriate type of sensor as the disclosure is not so limited.

Figure 2:
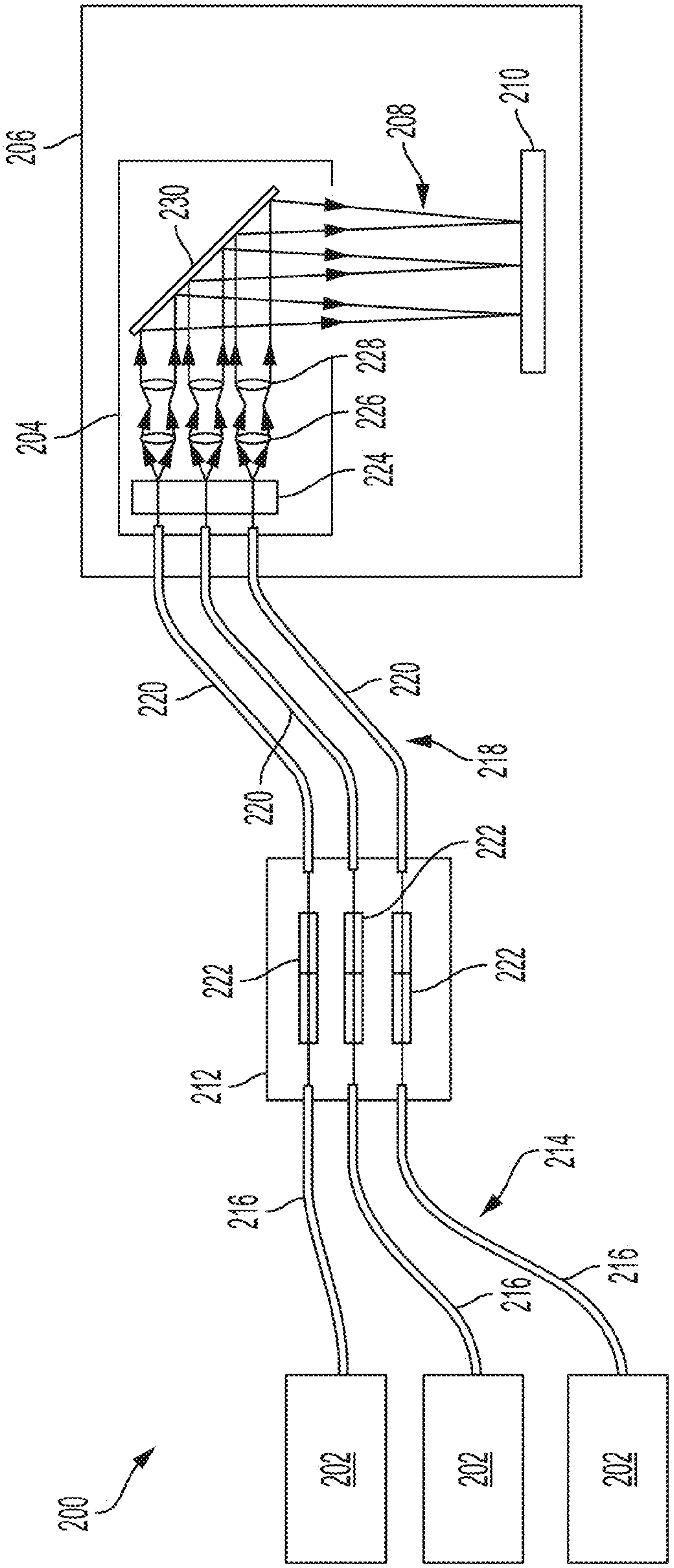
FIG. 2 shows the optical paths present in an additive manufacturing system according to some embodiments.

FIG. 2 shows a schematic representation of another embodiment of an additive manufacturing system 200. Similar to the embodiment discussed above in connection with FIG. 1, the additive manufacturing system 200 includes a plurality of laser energy sources 202 coupled to the optics assembly 204 within the machine enclosure 206 via the optical fiber connector 212. The first plurality of optical fibers 214 extends between the laser energy sources 202 and the optical fiber connector 212, and the second plurality of optical fibers 218 extends between the optical fiber connector 212 and optics assembly 204. In particular, each optical fiber 216 of the first plurality of optical fibers is coupled to a laser energy source 202 and corresponding optical fiber 220 of the second plurality of optical fibers 218. In the depicted embodiment, optical fibers 216 are coupled to corresponding optical fibers 220 via fusion splices 222 within the optical fiber connector 212. However, embodiments, in which the optical fibers positioned within the connector are optically coupled using other types of connections and/or single continuous optical fibers are used are also envisioned.

In the depicted embodiment, the optical fibers 220 of the second plurality of optical fibers 218 are optically coupled to an optics assembly 204 of the system. For example, an alignment fixture 224 is configured to define a desired spatial distribution of the optical fibers used to direct laser energy into the optics assembly. For example, the alignment fixture may comprise a block having a plurality of v-grooves or holes in which the optical fibers may be positioned and coupled to in order to accurately position the optical fibers within the system.

FIG. 2 also depicts exemplary optics that are optically coupled to and positioned downstream from the second plurality of optical fibers 218. The various optics included in the optics assembly may be configured to direct laser energy 208 from the second plurality of optical fibers 218 on the build surface 210 to form a desired array pattern of laser pixels on the build surface. For example, the optics assembly may include beam forming optics such as lenses 226 and 228 (which may be individual lenses, lens arrays, and/or combined macrolenses), mirrors 230, and/or any other appropriate type of optics disposed along the various optical paths between the optical fibers and the build surface 210 which may shape and direct the laser energy within the optics assembly. Once appropriately sized and shaped, the laser energy 208 may be directed onto the build surface 210 either through direct transmission and/or using a light directing element such as the depicted mirror 230.

Figure 3:
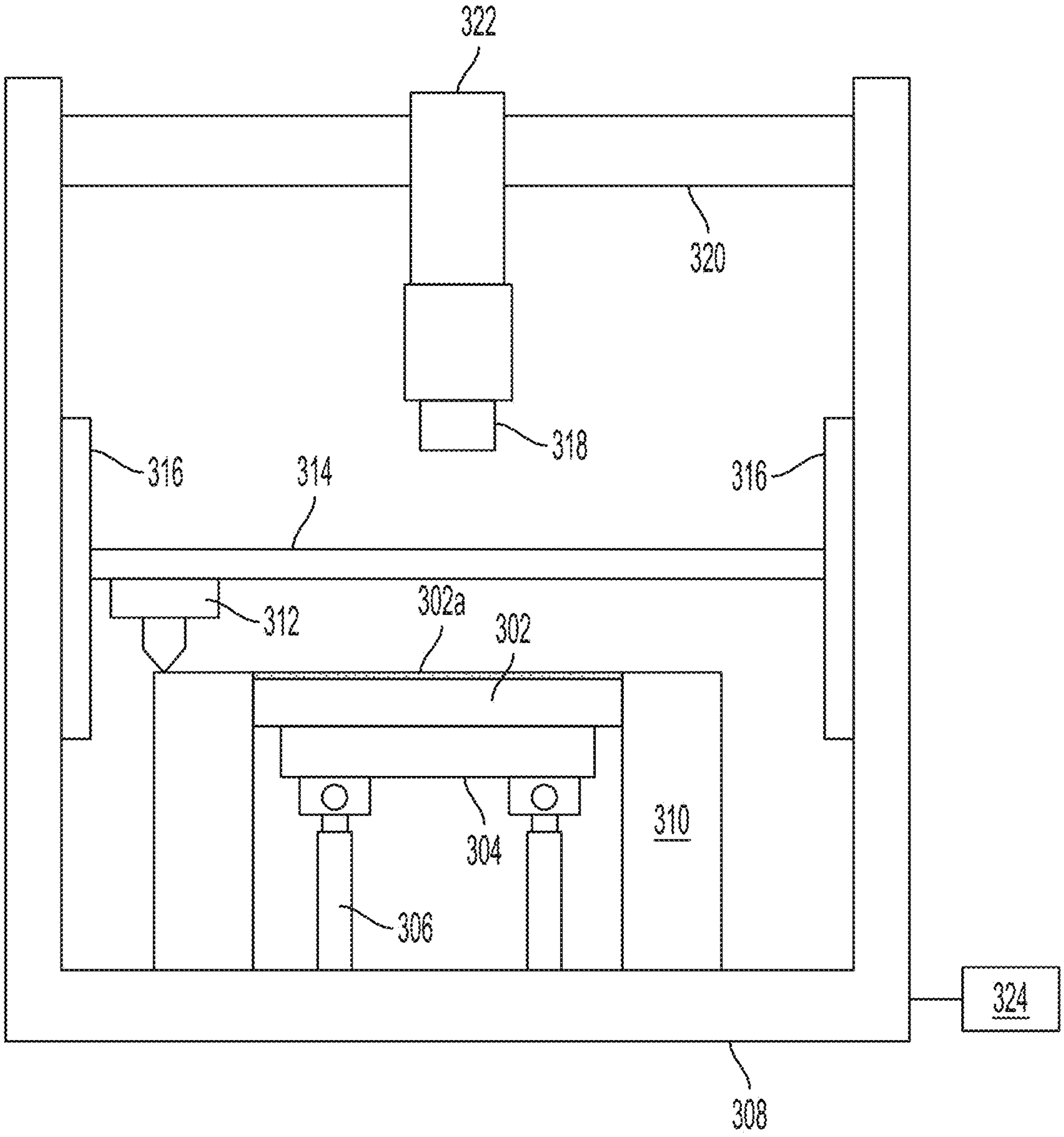
FIG. 3 shows an additive manufacturing system according to some embodiments.

FIG. 3 depicts one embodiment of an additive manufacturing system at the beginning of a build process. The additive manufacturing system includes a build plate 302 mounted on a fixed plate 304, which is in turn mounted on one or more vertical supports 306 that attach to a base 308 of the additive manufacturing system. In the depicted embodiment, the one or more vertical supports may correspond to one, two, and/or any other appropriate number of supports configured to support the build plate, and the corresponding build surface, at a desired position and orientation. For example, the supports depicted in the figure may correspond to one or more vertical motion stages configured to control a vertical position and orientation of the build plate. A powder containment shroud 310 may at least partially, and in some embodiments completely, surround a perimeter of the build plate 302 to support a volume of precursor material 302*a*, such as a volume of powder, disposed on the build plate and contained within the shroud. The shroud may be supported on the base 308 or by any other appropriate portion of the system.

The additive manufacturing system may include a powder deposition system in the form of a recoater 312 that is mounted on a horizontal motion stage 314 that allows the recoater to be moved back and forth across either a portion, or entire surface of the build plate 302. As the recoater traversers the build surface of the build plate, it deposits a precursor material 302*a*, such as a powder, onto the build plate and smooths the surface to provide a layer of precursor material with a predetermined thickness on top of the underlying volume of fused and/or unfused precursor material deposited during prior formation steps.

In some embodiments, the supports 306 of the build plate 302 may be used to index the build surface of the build plate 302 in a vertical downwards direction relative to a local direction of gravity. In such an embodiment, the recoater 312 may be held vertically stationary for dispensing precursor material 302*a*, such as a precursor powder, onto the exposed build surface of the build plate as the recoater is moved across the build plate each time the build plate is indexed downwards.

In some embodiments, the additive manufacturing system may also include an optics assembly 318 that is supported vertically above and oriented towards the build plate 302. As detailed above, the optics assembly may be optically coupled to one or more laser energy sources, not depicted, to direct laser energy in the form or one or more laser pixels onto the build surface of the build plate 302. To facilitate movement of the laser pixels across the build surface, the optics assembly may be configured to move in one, two, or any number of directions in a plane parallel to the build surface of the build plate. To provide this functionality, the optics assembly may be mounted on a gantry 320, or other actuated structure, that allows the optics unit to be scanned in plane parallel to the build surface of the build plate.

In the above embodiment, the build plate is indexed vertically while the remaining active portions of the system are held vertically stationary. However, embodiments, in which the build plate is held vertically stationary and the shroud 310, recoater 312, and optics assembly 318 are indexed vertically upwards relative to a local direction of gravity during formation of successive layers are also contemplated. In such an embodiment, the recoater horizontal motion stage 314 may be supported by vertical motion stages 316 that are configured to provide vertical movement of the recoater relative to the build plate. Corresponding vertical motion stages may also be provided for the shroud 310, not depicted, to index the shroud vertically upward relative to the build plate in such an embodiment. In some embodiments, the additive manufacturing system may also include an optics assembly 318 that is supported on a vertical motion stage 320 that is in turn mounted on the gantry 320 that allows the optics unit to be scanned in the plane of the build plate 302.

In the above embodiment, the vertical motion stages, horizontal motion stages, and gantry may correspond to any appropriate type of system that is configured to provide the desired vertical and/or horizontal motion. This may include supporting structures such as: rails; linear bearings, wheels, threaded shafts, and/or any other appropriate structure capable of supporting the various components during the desired movement. Movement of the components may also be provided using any appropriate type of actuator including, but not limited to, electric motors, stepper motors, hydraulic actuators, pneumatic actuators, electric actuators, and/or any other appropriate type of actuator as the disclosure is not so limited.

The additive manufacturing system executes one or more build plans. Build plans consist of the paths traced by the laser energy sources in the additive manufacturing process, including the thickness of each build layer. Build plans may additionally include other information such as which laser energy sources are on at particular locations relative to the build surface as well as a scan speed, laser pixel power, layer thickness, recoating parameters, and/or other appropriate process parameters. The paths may be based at least in part on the part geometries and orientations for any parts undergoing manufacture and may be determined prior to the start of the manufacturing process. In some embodiments, parameters associated with an individual layer of build plan may be adjusted during a build. A build process may begin after a group of pixels has been selected and the corresponding build plans are generated. Though, build plans may be generated "just in time" during a build process as well, as the current disclosure is not limited to how or when the build plans are generated.

In addition to the above, in some embodiments, the depicted additive manufacturing system may include one or more controllers 324 that are operatively coupled to the various actively controlled components of the additive manufacturing system. For example, the one or more controllers may be operatively coupled to the one or more supports 306, recoater 312, optics assembly 318, the various motion stages, and/or any other appropriate component of the system. In some embodiments, the one or more controllers may include one or more processors and associated non-transitory computer readable memory. The non-transitory computer readable memory may include processor executable instructions that when executed by the one or more processors cause the additive manufacturing system to perform any of the methods disclosed herein.

Figure 4:
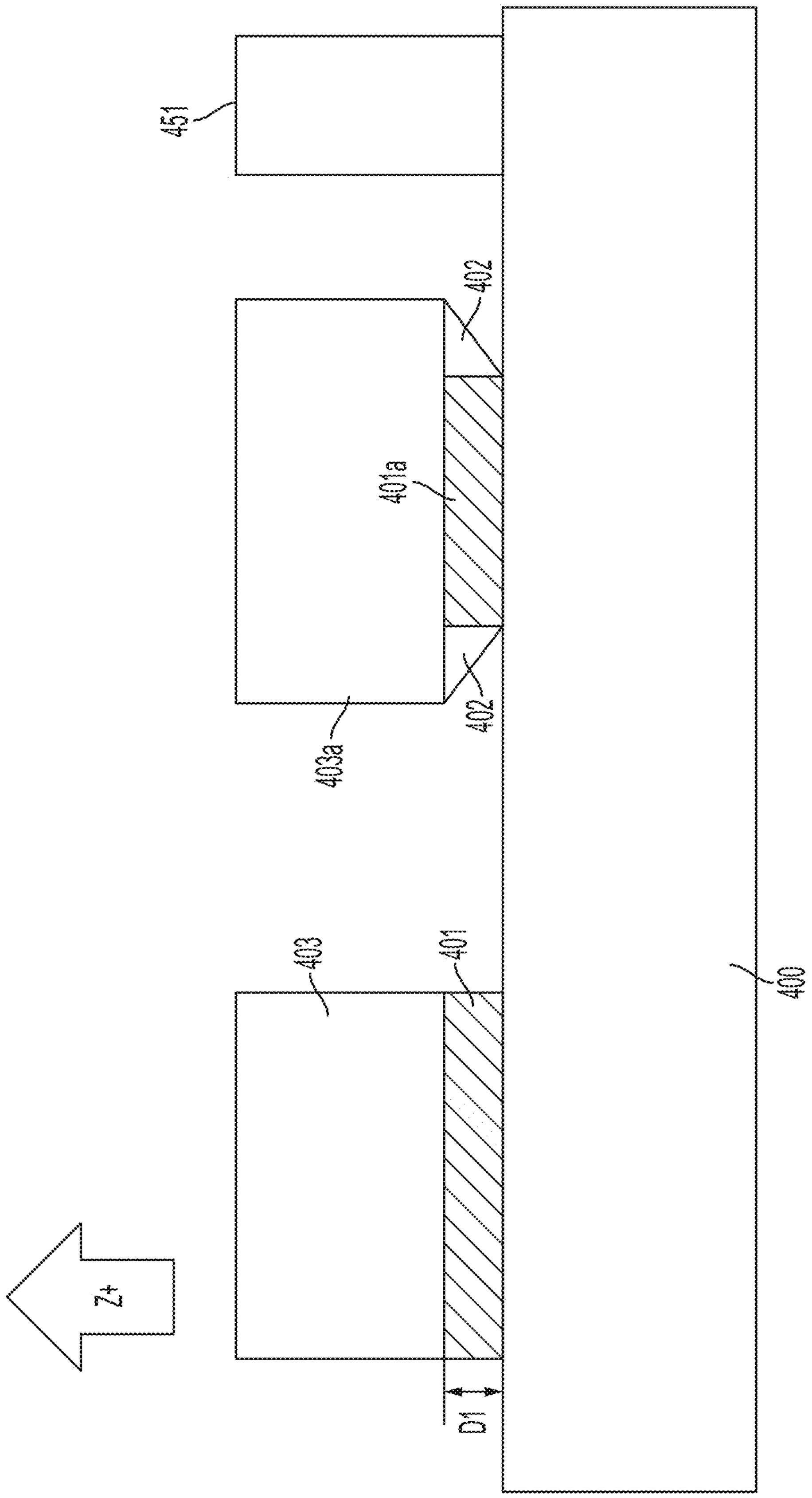
FIG. 4 shows a schematic of a build plate including tooling layers, parts and a calibration structure according to some embodiments.

In some embodiments, it may be desirable to either calibrate and/or verify the operability of the laser pixels of a laser pixel array of an additive manufacturing system prior to and/or during part formation to ensure viable lasers are used to form the one or more parts being formed on a build surface. For instance, during an additive manufacturing process, a tooling layer may be deposited onto a build plate before any parts are formed. The tooling layer serves to anchor the parts to the build plate and is cut away when the finished parts are removed from the build plate. FIG. 4 depicts a build plate 400, including tooling layers 401 and 401*a* and calibration structure 451. Parts 403 and 403*a* have been formed on tooling layers 401 and 401*a* respectively. Part 403*a* is additionally supported by scaffolds 402. Scaffolds may be used where parts have overhanging geometry and its use is not confined to the base of the part. Scaffolding and tooling layers may be temporary sacrificial structures that may be cut away from the parts during post processing. Thus, in some applications, a tooling layer may provide clearance between the build plate 400 and the bottom of the parts, see dimension D1 in the figure, to allow for removal of the parts from the build plate.

As noted previously, weld quality monitoring may be performed prior to and/or during a printing process to identify failed laser pixels. Thus, tooling layer construction may be used as an opportunity to test all potentially viable laser pixels and to assess their suitability for inclusion in the groups of contiguous viable laser pixels for use during a build process. It also provides an opportunity to calibrate and verify the calibration of different laser pixel groups to establish positional offsets between pixel arrays, so that it may be possible to switch back and forth between laser pixel arrays without creating an unacceptable shift, line, or other discontinuity in the parts being formed. For instance, a distance between welds formed with a first group of laser pixels relative to welds formed by a second group of laser pixels during this calibration may be used as the positional offset between the different groups of laser pixels. Some or all lasers may therefore be tested before the first layer of the parts are formed allowing redundancy and build plans to be established before part formation is initiated. In this way, a tooling layer such as tooling layers 401, 401*a* may be used as a calibration structure. If weld defects are detected, or if calibration offsets are printed into the tooling layer, the reduced requirements of the tooling layer may mean that such defects may not render the tooling layer useless since the tooling layer is sacrificial and may have lower process or quality assurance requirements than a part. Worst case, the tooling layer is often significantly less costly than the finished parts and it would be preferrable to abandon manufacture at this stage if needed.

In some embodiments, a calibration structure 451 may be formed on a portion of a build surface to test and calibrate laser pixels. A calibration structure may be a structure formed solely to check laser calibration, for example, the calibration structure 451 is shown as being disposed to a side of the parts on the build surface in the depicted embodiment. In other embodiments, a part may be assigned to serve as a calibration structure. It may be desirable to test calibration on the same part since defects may result from the process of calibration and may render the calibration structure as non-conforming.

In view of the above, a calibration structure may correspond either to a tooling layer of a part and/or a separate calibration structure. Additionally, these calibration and testing processes on the tooling layer and separate calibration structures may be used together at the same time during a build process or they may be used separately. It should be understood that the separate calibration structure and/or the tooling layer may have any appropriate size and/or shape such that a system may use the calibration structure and/or tooling layer for determining an operational state of either a currently selected group of laser pixels and/or all the laser pixels included in an array of laser pixels of a system.

To help facilitate the initial calibration and/or verification of viable pixels either prior to and/or during a print process, any of the above noted calibration structures may be included in a build plan for forming one or more parts with an additive manufacturing system. As this testing may include different groups of laser pixels, and potentially all the laser pixels of a laser array, the build plan may include instructions for laser pixels outside of the active group of laser pixels in some embodiments. In other embodiments, only laser pixels included within an active laser group and one or more prioritized redundant groups of pixels, such as a group of pixels that is the nearest redundant group of laser pixels, may be tested on the calibration structure. In some instances, the tested laser pixels may alternate between layers so that for instance a certain laser pixel, or group of laser pixels, is tested every n-layers where n may be any positive integer. Inactive laser pixels may fail during a build, such as by contamination. So, it may be advantageous to periodically test these laser pixels to ensure that they remain viable and that their position remains calibrated to the build plate. If a failure is identified within a redundant group of pixels, a process for selecting redundant laser pixel groups may be performed again to identify and rank new redundant groups of laser pixels, see below. In instances where different groups of laser pixels are tested during formation of a given build layer, a switchover between the selected group of laser pixels for forming the calibration structure may occur prior to and/or during formation of the calibration structure, though instances where the same laser pixels are used to form the calibration structure during formation of each layer are also contemplated.

While the use of specific calibration structures and timings are described above, it should be noted that laser pixel monitoring may be done continuously. This may include monitoring various indicators of laser pixel viability including the use of weld quality sensors. In instances when a laser pixel failure is detected, the additive manufacturing system may be configured to move the selected group of pixels to the calibration structure to assess the laser pixel failure and take corrective action prior to returning to printing the layer. However, instances in which a corrective action is taken without moving to the calibration structure are also contemplated.

In some embodiments, the calibration structure may be on the leading or trialing edge of the build plate to allow sufficient time to adjust the settings that are to be used for the parts in that layer or in the layer immediately following. Power, beam shape, other optical, and/or positional adjustments made on the calibration structure may either be the same or they may be different from the settings used for printing the one or more parts.

Figure 5A:
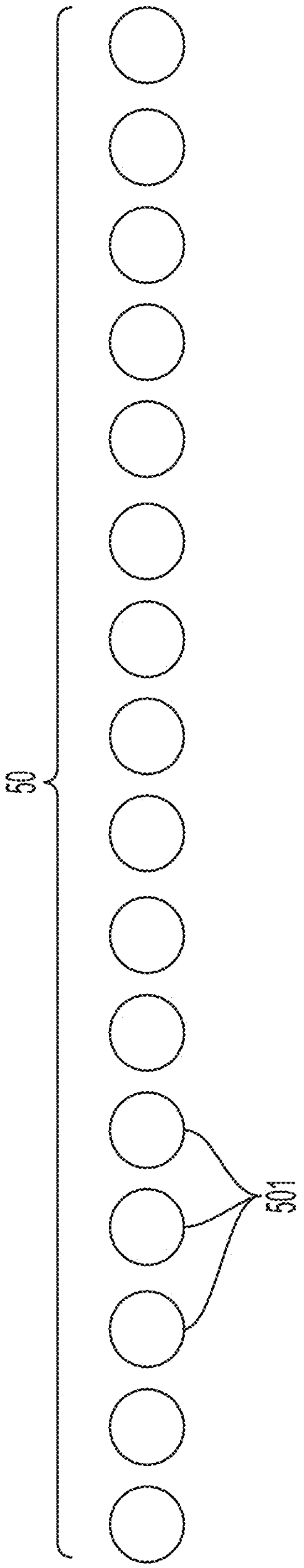
FIG. 5A shows an array of laser pixels according to some embodiments.

FIGS. 5A-5G illustrate various configurations of an arrays of laser pixels 50. FIG. 5A shows an array of laser pixels 50 which includes 16 laser pixels 501 in a linear array, though any number of lasers in any appropriate arrangement may be used. Each of the laser pixels 501 may be similar laser pixels in terms of spot size, shape, and distribution in some embodiments. However, it should be understood that the size and distribution of the array of laser pixels is illustrated for example only and different types of laser pixels may be used in some embodiments. Additionally, array of laser pixels 50 may either correspond to all of the laser pixels within an additive manufacturing system or a sub-set of the laser pixels as the current embodiment is referred to for exemplary purposes. The array of laser pixels 50 represents an array of laser pixels that may be viable but also may contain failed pixels. If the entirety of the array of laser pixels 50 are viable, then it would be possible to print using the entire array of laser pixels 50.

Figure 5B:
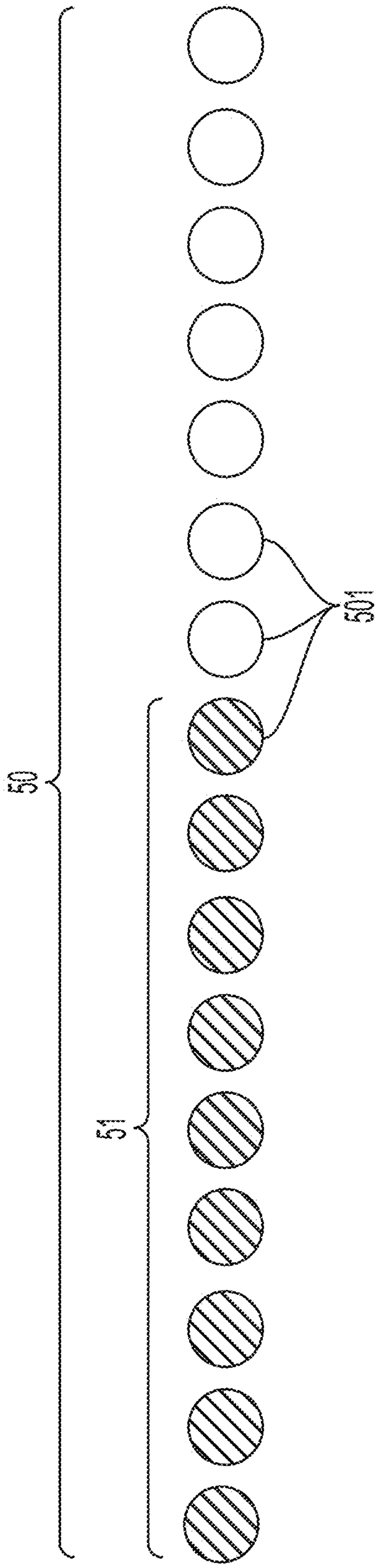
FIG. 5B shows an array of laser pixels grouped according to some embodiments.

FIG. 5B shows laser pixel array 50 now subdivided to include at least one group of contiguous laser pixels, pixel group 51. Each of the laser pixels 501 may still be similar within and outside of group 51, the shading is included only to assist in identifying the group in the illustration. If all laser pixels within group 51 are viable, then group 51 may be used to form a part in a manufacturing process. It should be noted, that while group 51 is smaller than array of laser pixels 50, group 51 is large enough that no separate redundant groups of pixels may exist within the array of laser pixels 50. Separate redundant groups as used herein may mean the groups are non-overlapping and therefore do not share any laser pixels in common. Said another way any group of contiguous viable laser pixels redundant to the group of pixels 51 (i.e., including the same number of pixels) would also include laser pixels from original group 51, therefore while additional groups might be defined, these groups would not be fully redundant. If for instance the rightmost laser pixel of group 51 were to fail, there would be no same-size redundant groups within overall pixel array 50. A smaller redundant group could be formed, however a new build plan may be needed to reflect the smaller number of contiguous viable laser pixels. However, embodiments in which overlapping groups of laser pixels are defined are also contemplated. For example, a portion of the laser pixels included in group 51 may also be included in another group including other laser pixels adjacent to and contiguous with group 51. Overlapping groups may be considered at any point during the manufacturing process including after all redundant, non-overlapping, arrays of contiguous viable pixels have been expended. For example, selection of an overlapping array may be preferable to abandoning a build process of one or more parts.

Figure 5C:
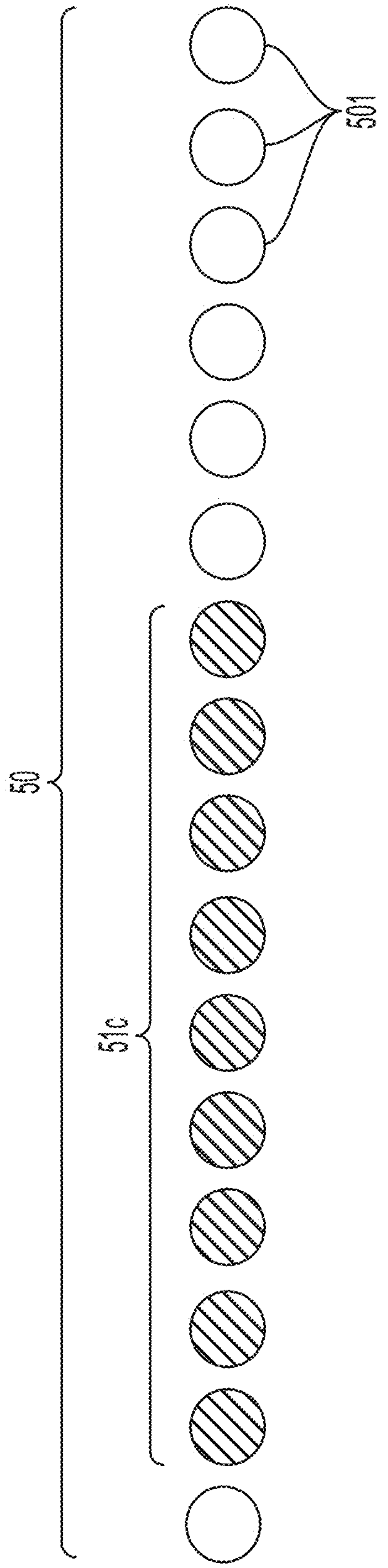
FIG. 5C shows an array of laser pixels grouped according to some embodiments.
Figure 5D:
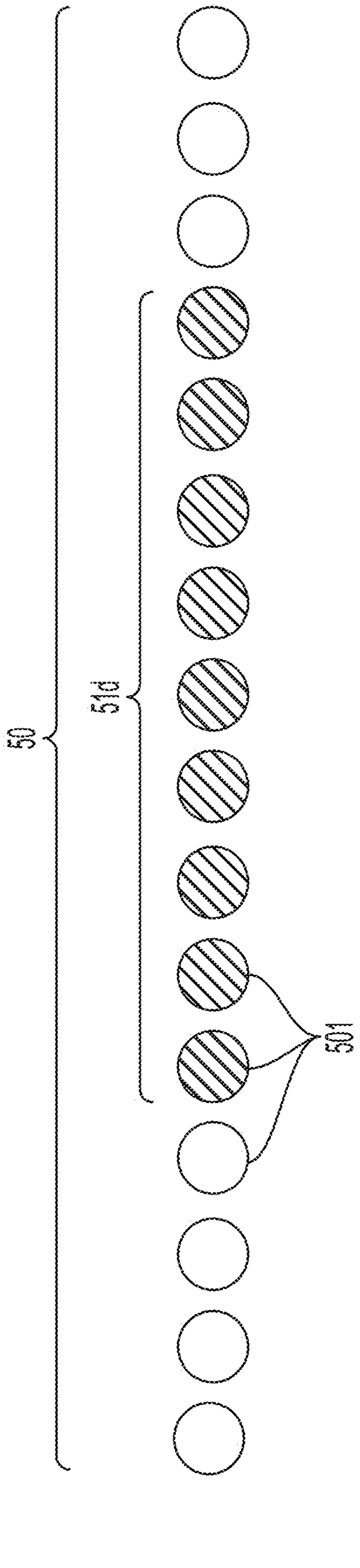
FIG. 5D shows an array of laser pixels grouped according to some embodiments.

FIGS. 5C and 5D illustrate alternate ways of dividing the original array of laser pixels 50 into sub-sets including groups 51*c* and 51*d* respectively. 51*c* and 51*d* each include 9 laser pixels as in group 51, though again pixel groups with different numbers of laser pixels may also be selected. A print may be run with laser pixel groups 51, 51*c*, 51*d*, and/or any other appropriate group of pixels. As these groups include the same number of laser pixels, that is the group size is the same, it may be possible to use a current build plan when switching between the groups rather than generating a new build plan if for instance it is needed to switch to a different group with a different number of laser pixels. For example, if original group 51 were to experience a failure of the leftmost laser pixel, it may be possible to switch to either of groups 51*c* or 51*d* and continue printing with a same-size group of contiguous viable laser pixels. In this example group 51*d* may be preferrable to 51*c* to avoid using a laser pixel near a failed laser pixel, as discussed below. Groups 51, 51*c* and 51*d* represent potentially redundant groups of viable contiguous laser pixels. However, these groups are not completely redundant pixel groups as they share some laser pixels in common. Therefore, failure of one of these common laser pixels would render all three groups unusable.

To provide improved redundancy and failure tolerance, it may be desirable to provide groups of laser pixels that are separate from one another such that the groups do not include any common laser pixels in some embodiments. If a failure of a laser pixel within the initially selected group of pixels is detected, the system may switch to a redundant group of pixels. Another same-size pixel group without any common laser pixels would be a fully redundant group of pixels. In such an embodiment, the system may switch pixel groups and continue printing without generating new build plans, although a positional calibration may be desirable in some embodiments. If another same-size group of contiguous viable laser pixels is not available, then an alternate smaller group of pixels may be selected instead. If a larger pixel group were available, then a subset of that larger group of pixels would be redundant to the original group of pixels. New build plans may need to be generated in instances when the number of laser pixels available in the new group of pixels is different than in the current group of pixels, this may result in a slower build time but may allow the print to continue and preserve the resources already invested therein. In some cases, the control system may generate and store alternative build plans for smaller groups of pixels. Redundant build plans may be calculated when processor capacity is available. Build plans may be stored in memory for a rapid switch over should a failure be detected in a group of pixels where a same-size redundant group of laser pixels is not available and a different size group is selected to continue the print. For recurring print jobs, frequently used build plans may be stored in associated non-transitory computer readable memory for retrieval in the event of a failure, or to save processing time at the start of a print. Alternatively, just in time build plans that are generated in real time during a build process and/or the generation of build plans prior to continuing a process may also be used as the disclosure is not so limited.

Figure 5E:
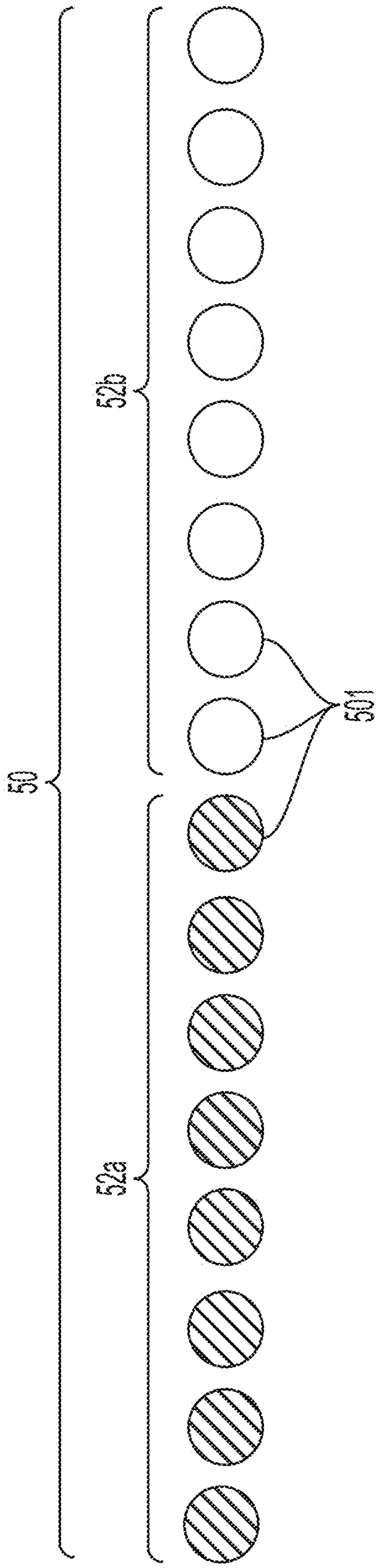
FIG. 5E shows an array of laser pixels grouped according to some embodiments.

FIG. 5E depicts another way of dividing original array of laser pixels 50 to form at least two equal size groups 52*a* and 52*b*. Groups 52*a* and 52*b* represent fully separate (i.e., fully redundant) groupings of viable contiguous laser pixels. Thus, it may be possible to switch between group 52*a* and 52*b* without regenerating build plans regardless of the number or position of the laser pixels that fail within a single one of the groups. For example, group 52*b* would remain viable if any laser pixel of group 52*a* were to fail and vice versa (for the moment neglecting any potential concerns of using near-to-failed laser pixels to be further discussed below). Printing with pixel groups 52*a* or 52*b* may be slightly slower than with groups 51, 51*c* or 51*d* but 52*a* or 52*b*, but would offer greater redundancy and a potential for time savings, and/or reducing the potential for forming defects, should a switchover be needed during a printing process. Conversely, printing with the full array of laser pixels 50 would be faster still but would offer no potential for redundancy if a laser pixel failure were to occur.

Figure 5F:
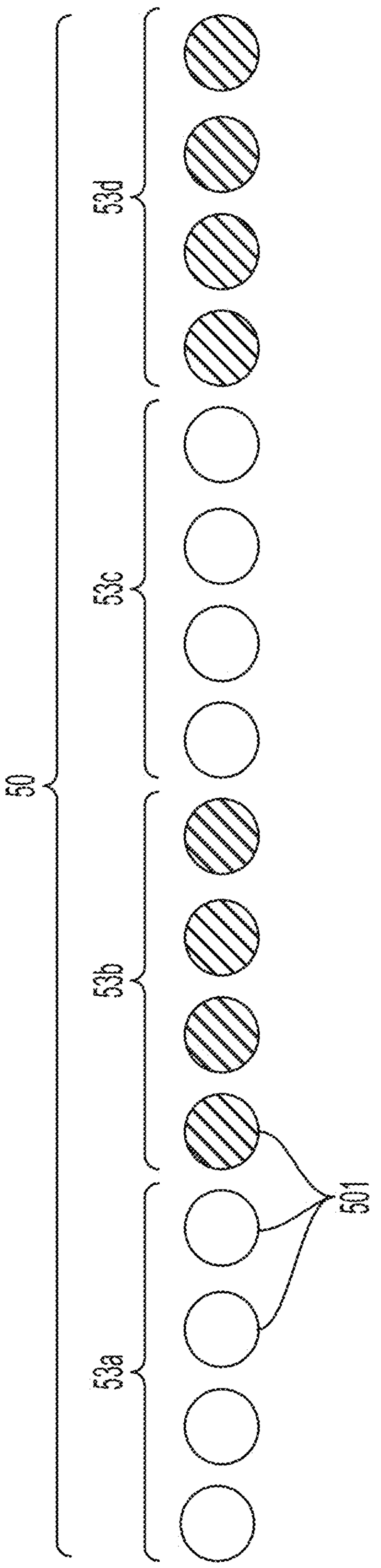
FIG. 5F shows an array of laser pixels grouped according to some embodiments.
Figure 5G:
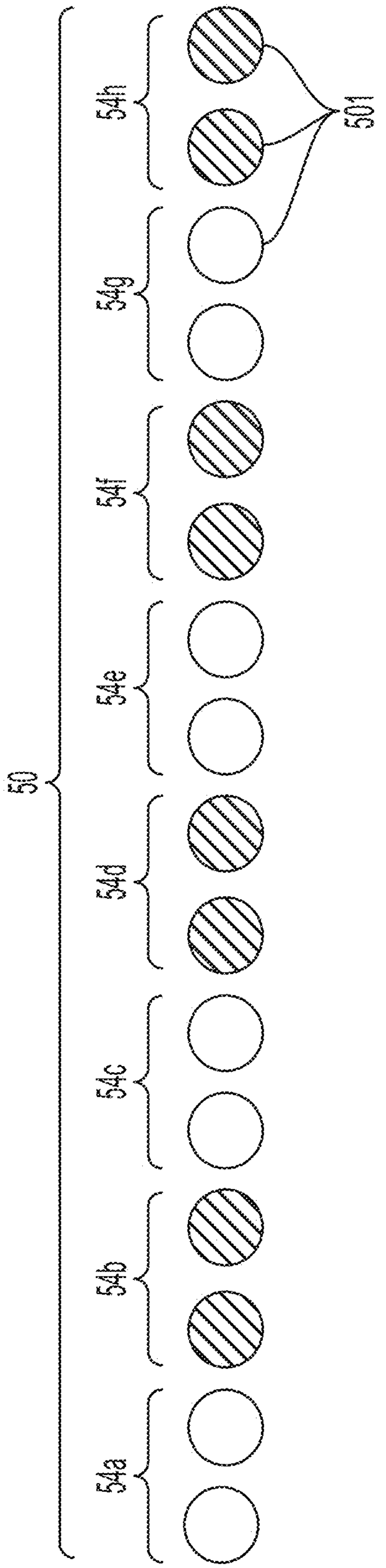
FIG. 5G shows an array of laser pixels grouped according to some embodiments.

FIG. 5F depicts another possible division of the array of laser pixels 50 into different groups. Here the laser pixels 501 are divided into four separate same-size groups of contiguous viable laser pixels 53*a*-53*d*. Redundancy is further increased as now there are three potential fully redundant groups with separate sets of laser pixels that may be selected for performing a printing process. As the groups 53*a*-53*d* are smaller, printing time may increase. Due to movements of the optics head including acceleration and deceleration, printing with group 53*a* may take more than twice as long as 52*a* in some cases. However, this may still be preferable to faster printing speeds to avoid potential increases in part defects and/or loss of an overall printing process in instances where it is not possible to continue printing with similar group sizes after a laser pixel failure occurs. FIG. 5G illustrates another potential division of the array of laser pixels 50 where eight fully redundant groups including two contiguous viable laser pixels 54*a*-54*h* are provided. Printing times for this potential division of the laser pixels would be still further reduced relative to groups 53*a*-53*d*, but would again offer increased redundancy.

In the above embodiments, a specific laser pixel array size and potential sub-groupings of the laser pixels are illustrated. However, it should be understood that laser pixel arrays with different numbers of laser pixels as well as different numbers and arrangements of laser pixel groups are contemplated. Additionally, instances in which separate groups with different numbers of laser pixels are defined relative to a laser pixel array for potential use during a printing process are also possible as the disclosure is not so limited.

According to some embodiments, groups of pixels may include $2^n$ lasers where n is any positive integer such as to include 32, 64, 128 or more laser pixels. However, it should be understood that groups of pixels may include any number of laser pixels up to and including the total number of lasers pixels included in an array of laser pixels for an additive manufacturing system. For example, a number of laser pixels included in a group may be greater than or less than 2, 5, 10, 20, 30, 40, 50 and/or any other appropriate number. The number of pixels may also be less than or equal to 500, 400, 300, 200, 100, 50, 40, 30, 20, and/or any other appropriate number of laser pixels. Combinations of the forgoing are contemplated including for example, between or equal to 2 and 500, 5 and 500, 10 and 100, 10 and 50, and/or other appropriate combinations. Additionally, it should be understood that groups with different numbers of laser pixels including ranges both greater than and less than those noted above are also contemplated.

Figure 6A:
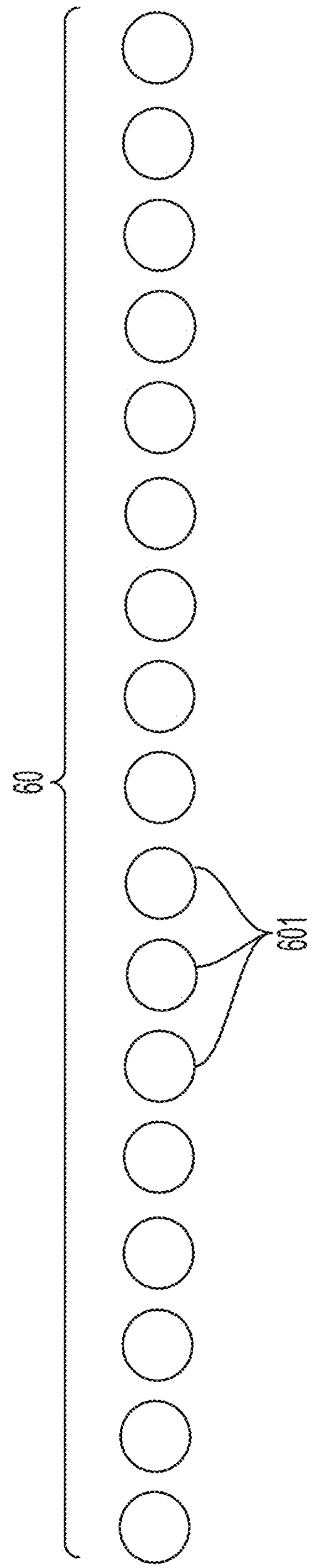
FIG. 6A shows an array of laser pixels according to some embodiments.
Figure 6B:
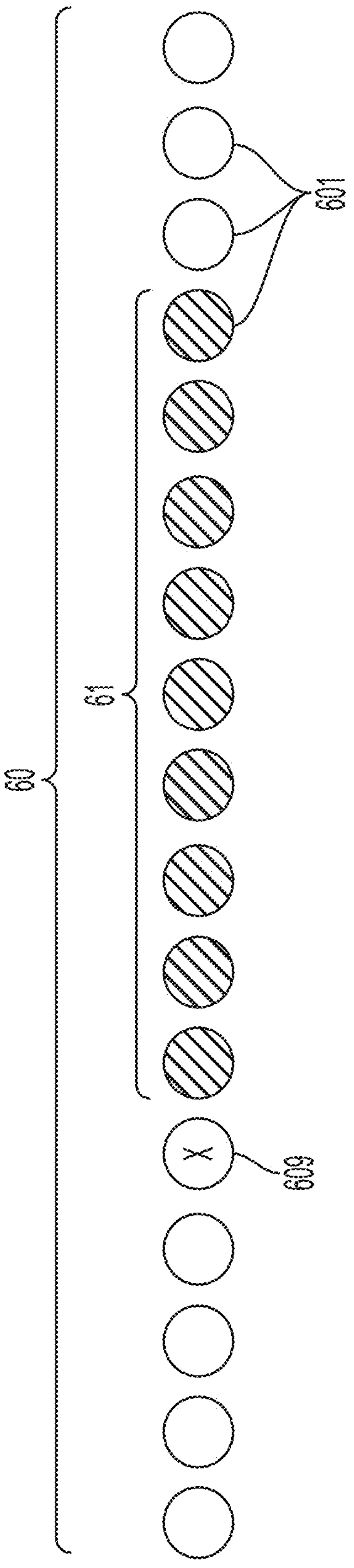
FIG. 6B shows an array of laser pixels including a failed laser pixel, grouped according to some embodiments.

Having detailed the general concept of grouping laser pixels within an overall laser pixel array, instances in which one or more failed laser pixels are present within the laser pixel array are illustrated. For example, FIG. 6A depicts an array of laser pixels 60 with laser pixels 601. Pixel array 60 may be part of a larger array of laser pixels or may represent a total number of laser pixels within an additive manufacturing system. The number of laser pixels in the figure is for illustration only and is not intended to be limiting. Prior to testing and calibration, it may not be known if the array of laser pixels 60 includes any failed laser pixels. FIG. 6B illustrates the array of laser pixels 60 again. Here laser pixel 609 has been identified as a failed laser pixel as noted by the "X" in the figure. As noted previously, a failed laser pixel may correspond to any number of different types of failures including a complete failure of an associated laser energy source. However, other types of failures may include instances in which a failed laser pixel still transmits laser energy but may do so with improper aim, improper intensity, improper energy modes, or some other characteristic that has been determined to render the failed laser pixel unsuitable for use.

Figure 6C:
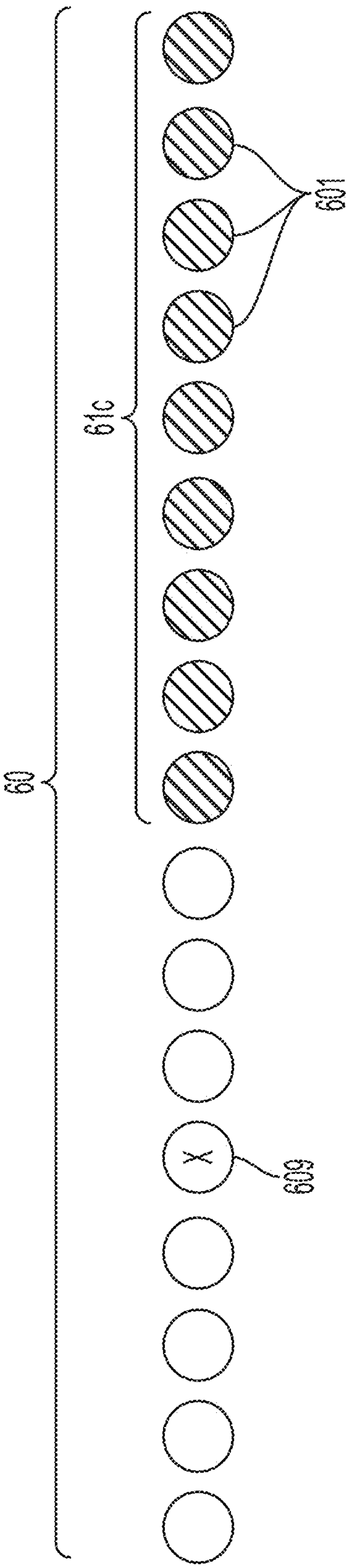
FIG. 6C shows an array of laser pixels including a failed laser pixel, grouped according to some embodiments.

FIGS. 6B and 6C depict the array of laser pixels 60 including failed laser pixel 609 showing different divisions of the remaining viable laser pixels to form a group of nine contiguous viable laser pixels. It should be noted that the choice of nine contiguous laser pixels is arbitrary for illustrative purposes only and larger groups (up to twelve) or groups with fewer numbers of laser pixels and greater redundancy are also possible. As shown in FIGS. 6B and 6C, groups of pixels 61 and 61*c* may be selected to include the same number of contiguous viable laser pixels. Groups 61 and 61*c* may, however, need to share some laser pixels in common and so therefore would not be fully redundant groups. Laser pixels adjacent to other failed laser pixels may be at a higher risk for laser failure as well. Therefore, group 61*c* which is separated from the failures laser pixel 609 may be advantageous to use as compared to group 61 which includes a laser pixel directly adjacent to the failed laser pixel 609.

Figure 6D:
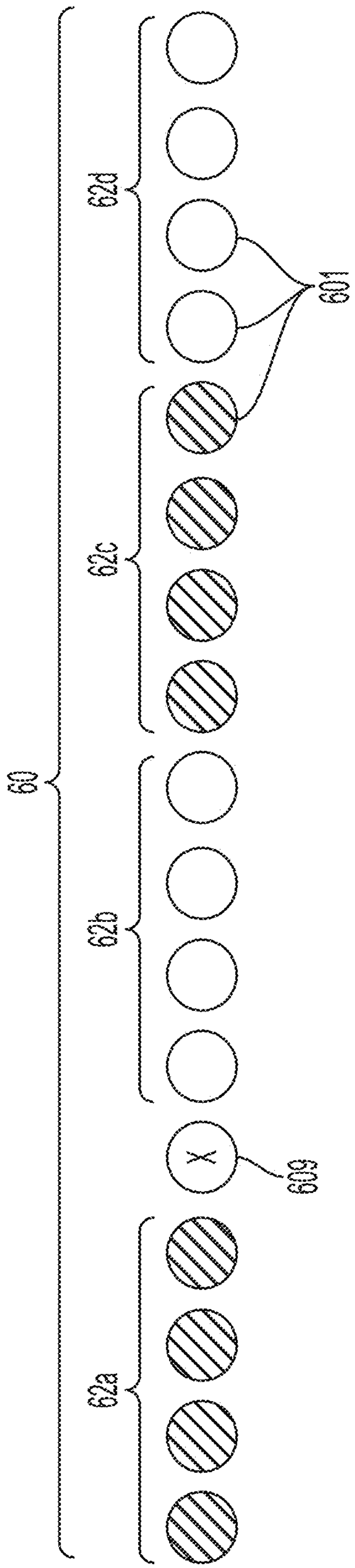
FIG. 6D shows an array of laser pixels including a failed laser pixel, grouped according to some embodiments.
Figure 6E:
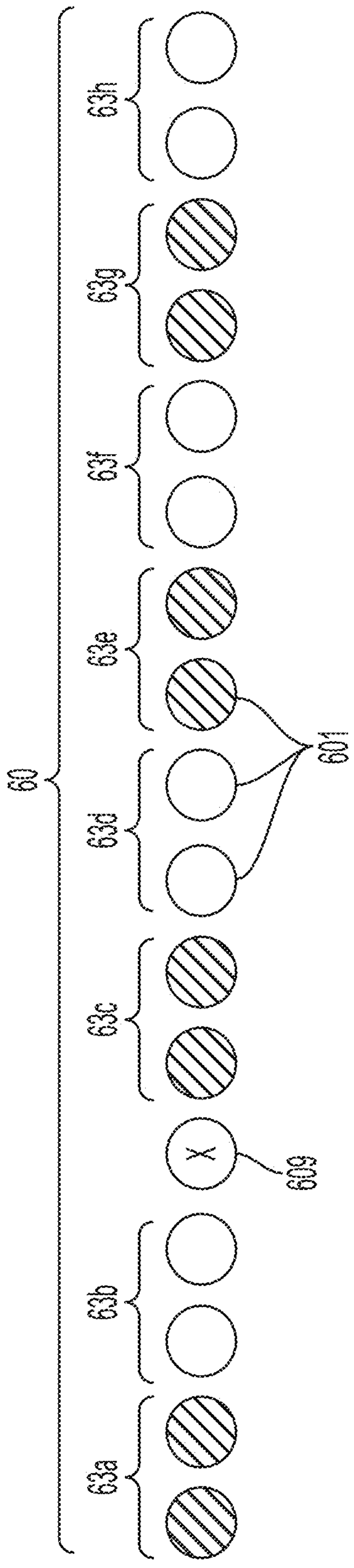
FIG. 6E shows an array of laser pixels including a failed laser pixel, grouped according to some embodiments.

FIG. 6D depicts another potential way to sub-divide the pixel array 60 such that it includes additional fully redundant contiguous viable laser pixel groups. Specifically, the figure illustrates the formation of four same-size fully redundant contiguous laser pixel groups 62*a*-62*d*. The location of failed pixel 609 limits the size of a group of contiguous viable pixels that may be used to form redundant groups. For instance, one group of twelve laser pixels or two independent groups of six pixels could be created to the right of failed pixel 609. If it is desired to use the laser pixels to the left of failed pixel 609, or to form three redundant groups of pixels, then the maximum sub-divided group size within the total array of laser pixels 60 would be groups of four pixels such as 62*a*-62*d* illustrated in FIG. 6D. In some cases, this division may be preferable to that of pixel groups 61 or 61*c* due to the ability to rapidly switch to same-size redundant groups in the event of an additional laser pixel failure. FIG. 6E show another division of the laser pixel array into eight groups of pixels 63*a*-63*h* including two separate laser pixels each. The increased redundancy would come at the expense of printing speed.

It has been noted that in some cases it may be desirable to avoid using laser pixels proximate to one or more failed laser pixels. Specifically, in some cases laser pixels within a certain distance of certain types of laser pixel failures may be treated as failed laser pixels themselves. This may occur in the case where an original failed laser pixel has burned its optical path or failed in a manner that may generate excessive spatter, smoke or other debris that may settle on or otherwise damage near neighboring laser pixels. Such debris may result in thermal discontinuities, i.e., "hot spots" or otherwise result in rapid or premature failure of the affected laser pixels nearby. Avoiding those nearby laser pixels may avoid causing a cascade which may result in the contamination and subsequent failure of yet more laser pixels. For this reason, it may sometimes be desirable to avoid using laser pixels that are proximate to a failed laser pixel. For example, laser pixels within a set distance and/or number of laser pixels relative to a failed laser pixel may be excluded from use in some embodiments to prevent the failures from propagating and/or from using laser pixels that may be at a higher likelihood of failure during a printing process even if a cascading failure is unlikely. In these types of embodiments, these laser pixels adjacent to, or within a set threshold from, the known failed laser pixel may also be considered to be failed laser pixels. In other cases, if the likelihood of contamination or damage to nearby laser pixels is determined to be sufficiently low, there may not be reason to avoid those near-to-failed laser pixels. Furthermore, in some embodiments near-to-failed laser pixels may receive consideration in the event that all other redundant pixel groups have been expended. In such cases using a laser pixel with a previously unacceptable likelihood of failure may be preferable to abandoning a print process.

Figure 7:
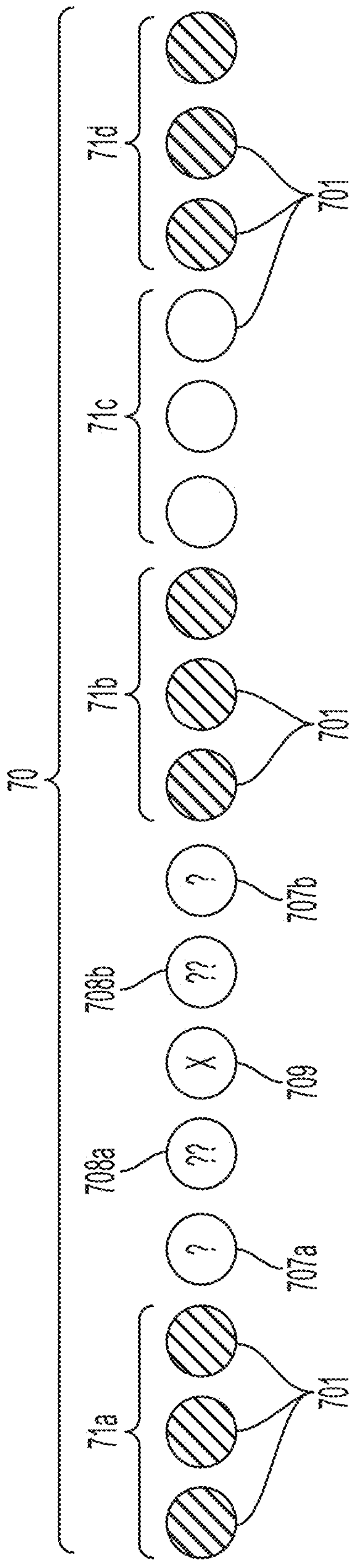
FIG. 7 shows an array of laser pixels including a failed laser pixel and adjacent excluded laser pixels according to some embodiments.

FIG. 7 shows an example of an array of laser pixels 70 including a failed laser pixel 709 that may have failed in a manner that could generate debris, contamination, and/or otherwise potentially damage adjacent laser pixels. As a result, the operability of nearby laser pixels may be questionable. Laser pixels 708*a* and 708*b* that are directly adjacent to the known failed laser pixel 709 may be more susceptible to damage than for instance laser pixels 707*a* and 707*b* that are more removed from the failed laser pixel 709 although these may still be more susceptible than the other laser pixels 701 that are further removed from the failed laser pixel. In this case, laser pixels 707*a/b* and 708*a/b* may be within a threshold distance around failed pixel 709 such that they may also be considered to be failed laser pixels for operational purposes of the laser pixel array. Depending on the embodiment, this threshold distance may include the first 1, 2, 3, or any other appropriate number of laser pixels that are adjacent to and on either side of a failed laser pixel. It should be understood that this threshold distance may vary according to the process, the type of failure and other parameters. Historical failure data may be used to establish appropriate threshold distances, numbers of adjacent laser pixels, or other parameters for handling near-to-failed laser pixels. For instance, historical failure data may include the failure rate or contamination data for near-to-failed pixels and their location in relation to the failed laser pixel. Groups of pixels 71*a*-71*d* represent one way, but not the only way, of grouping the remaining viable laser pixels within the array of laser pixels 70. For example, the groups 71*b*-71*d* comprise nine contiguous viable pixels between them, which could form a single group of nine pixels. However, the nine laser pixel group would not have any redundant pixel groups from within original array 70. Alternatively, the nine contiguous viable laser pixels in groups 71*b*-71*d* could form two non-overlapping groups of four pixels or four groups of two pixels. The selection of a group size of three laser pixels allows for redundant pixel groups matching the size of the smaller contiguous viable pixel group 71*a* to the left of the failed laser pixels. Accordingly, in some embodiments, the larger group including multiple contiguous groups that are aligned with each other and may be subdivided into multiple adjacent groups may be initially selected to form parts, while the three pixel group 71*a* that is spaced apart from the larger set of contiguous groups may be a redundant group in case of a failure of any laser pixel within the nine pixel group of pixels. While specific numbers of laser pixels are discussed relative to the above concept, this concept may apply to groupings as well.

According to some embodiments the process of selecting a group of pixels may include establishing weighting factors and assigning those factors to the process parameters including some or all of the parameters described above. The total value of a weighting function may then be used to rank groups of pixels and thereby make a quantitative selection. Weighting factors may be applied to rank individual laser pixels, groups of laser pixels, or both. Weighting factors can be determined in any appropriate. In some embodiments, a weighting function may be tied to the cost per unit of a weighted quantity (for instance $ per hour ($/hr)). Other performance metrics that may be used to weight the various process parameters may include, but are not limited to, process reliability (e.g., increased redundancy from larger numbers of redundant pixel groups), print time, part value, part quality, probability of laser pixel failure, and/or any other appropriate weighting parameter.

In some embodiments, the weightings and/or other parameters may be determined from analysis of historical data from the additive manufacturing process. This data may include performance data from the subject additive manufacturing system or from other similar additive manufacturing systems and may include data on system settings/parameters, data on manufacturing costs, data on quality of finished part and other data from previous additive manufacturing processes as appropriate. Historical and/or statistical data may be used to weight for or against the use of specific laser pixels. For instance, a laser pixel may be weighted to bias against use if historical or statistical data predicts a likelihood of failure above a threshold probability or other metric during the next print. For instance, the statistical life span of a laser pixel may be determined and known for every laser pixel within an additive manufacturing system. Likewise, the usage time (i.e., run time) of every laser pixel may be known and recorded. Using the statistical rate of failure and life of each pixel known, the likelihood of any laser pixel failing during the estimated time for a desired printing process may be determined. The statistical life of different laser pixels may be different and may be related to factors including the laser energy source to which the laser pixel is connected and/or the location of the laser pixel in an array of laser pixels, and/or the process parameters of the printing process including the type of precursor material being fused. That likelihood may then be used as a weighting factor, or if it is sufficiently high (e.g., above a threshold probability), may be used to disqualify a laser pixel for inclusion in a printing process.

The above noted weighting factors may be applied to any number of process parameters under consideration to determine a total weight for each pixel or for an entire group of pixels. In some instances, the process parameters may be varied and the grouping selections may be examined multiple times to identify a desired set of one or more groups of laser pixels for using during a printing process. For instance, in some embodiments, different numbers of laser pixels in a group and/or different numbers of redundant laser groups may be evaluated with the above described weighting function to select a desired set of one or more groups for use during a printing process. In some embodiments, the controller may weight towards selection of group sizes corresponding to points of system efficiency and away from group sizes corresponding with points of system inefficiency. In some embodiments, printing time such as time to print one layer, may be an efficiency metric. In other cases, cost efficiency metrics may be used. For instance, power supplies shared amongst more than one laser energy source may have a peak electrical efficiency at an intermediate laser power load. Factoring in the price of electricity, the cost of the layer may become an electrical cost efficiency metric that may bias selection toward smaller group sizes. Cooling systems may present similar cost efficiencies. Similarly, for very small laser pixel arrays, the cost of electricity, gas, cooling, and heating for the rest of the additive manufacturing system may make overall efficiency or cost less attractive, representing a point of system inefficiency in some instances. Selections with the highest (for instance highest value, reliability, or quality) or lowest (for instance lowest cost, or time) total weight may be the desired selection.

Weightings may be used to assess trade-off in decision making, such as whether to increase the speed of a print by using a larger group of pixels, or to favor redundancy. For instance, the fastest print may prioritize selecting the largest group of pixels. Alternatively, for instance, four groups of pixels with 16 laser pixels may be better than two groups of pixels with 32 laser pixels if redundancy is prioritized over print speed for a particular process. Weightings may also bias away from laser pixels that are closer to failed laser pixels or bias against individual laser pixels or groups of pixels that have historically experienced lower reliability. Weightings may also consider a timing of a decision relative to the duration a print process has been performed, for instance decisions may be made differently in the final hours of a week-long print than in the initial hours of the same print.

Figure 8:
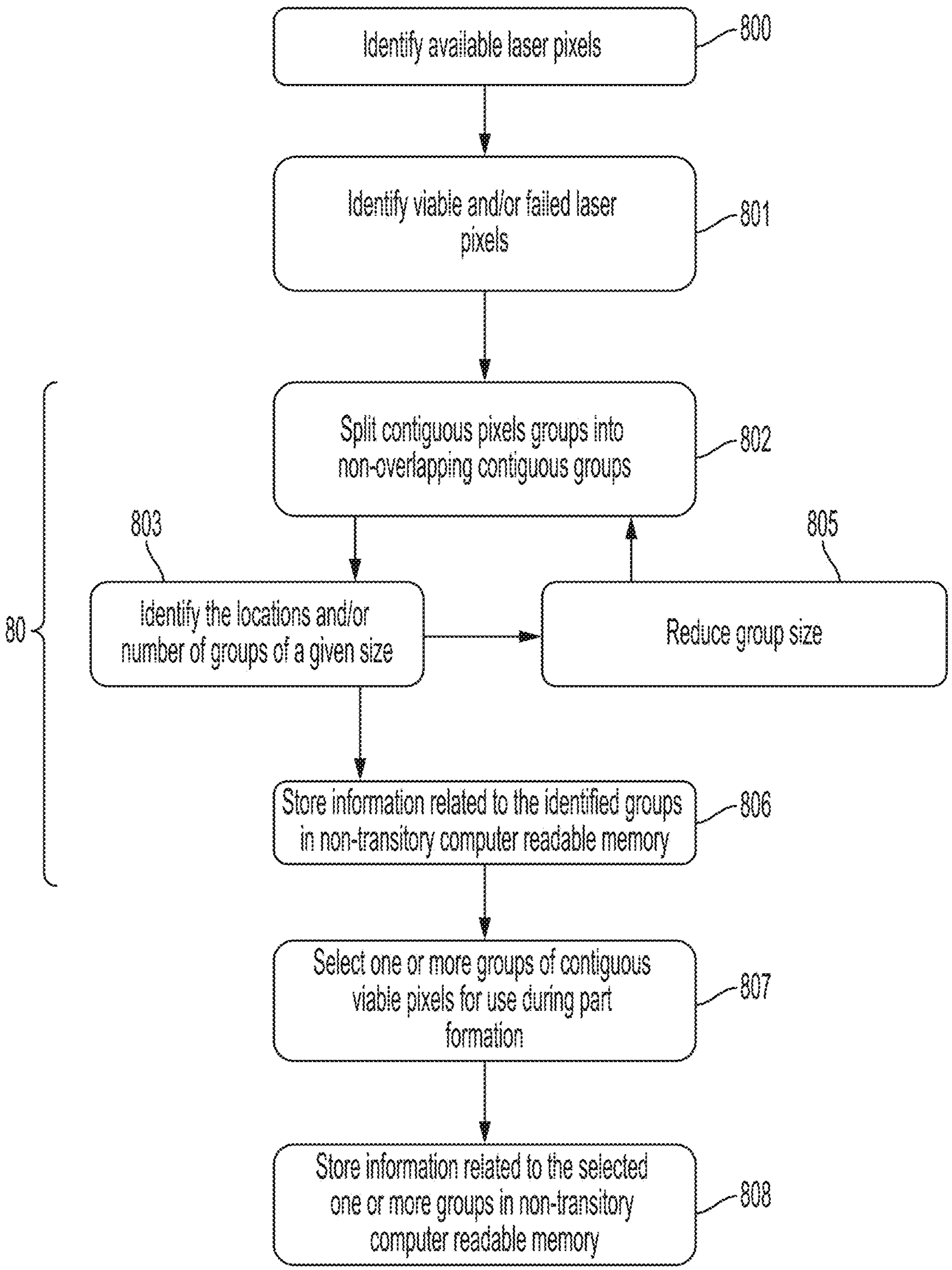
FIG. 8 shows a process diagram for laser pixel selection according to one embodiment.

FIG. 8 depicts one embodiment of a process flow diagram for laser pixel selection for use in a build process by an additive manufacturing system. Available laser pixels may be identified at 800. This may include identification of an array of laser pixels which may correspond to the entire set of laser pixels included in an additive manufacturing system. This initial set of identified laser pixels may include both viable laser pixels and failed pixels. From this array of available laser pixels, the viable laser pixels and failed laser pixels may be identified at 801. This identification may correspond to any number of different methods and/or metrics for identifying viable and failed laser pixels. For example, failed laser pixels may be determined using measured performance metrics including the intensity of the one or more laser pixels. Identification of failed laser pixels may also include identifying presently conforming pixels that may be determined as likely to fail, such as by reaching the end of their statistical life during the build, or due to possible contamination, or from proximity to other failed laser pixels, or as a result of observed performance metrics, or indicating a change in performance that may be correlated to impending failure. According to some embodiments, the failed laser pixels may be identified based at least in part on a failure signal received from one or more of the laser energy sources. In some embodiments, one or more failed laser pixels may be identified based at least in part on a weld quality measurement from a weld quality sensor. Further, as described above, the weld quality measurement may be performed on a tooling layer, a separate calibration structure, or one or more parts being formed on the build surface. In some cases all laser pixels may be viable with no failed laser pixels present. In view of the above, it should be understood that the viable and failed laser pixels included in an array may be identified using any appropriate method and/or metric as the disclosure is not so limited.

After identification of failed and/or viable pixels, pixel group selection may be performed as indicated by process 80. During this process, one or more groups of contiguous viable laser pixels of the plurality of laser pixels may be identified for use during a print process. The one or more contiguous groups of viable laser pixels included in the array of pixels may be sub-divided into equal size, non-overlapping contiguous groups at 802. During an initial iteration of this process, groups corresponding to the largest potential grouping of contiguous viable pixels may be identified. The number and location of separate laser pixel groups of that size may then be identified at 803. This would be the number of redundant same-size contiguous pixel groups for the current group size being evaluated. As the groups were selected to be non-overlapping, each group would form a grouping of unique laser pixels. However, instances in which partially overlapping groups of viable pixels are identified are also contemplated. After identifying the location and/or numbers of pixel groups exhibiting the currently selected group size, the size of the groups may be changed at 805. For example, the group size may be reduced by a preset modifier, a lower predetermined group size may be selected, and/or other appropriate methods of selecting smaller group sizes for evaluation may be used. In either case, the smaller group size may be used to repeat steps 802 and 804 for the new group size. This may be done for any number of different group sizes as noted previously. For example, process 80 may be repeated for every potential group size ranging between a minimum predetermined group size (e.g., a single laser pixel, 2 laser pixels, 5 laser pixels, etc.) and the largest potential group of contiguous viable laser pixels included in the array of laser pixels. Alternatively, group sizes to be evaluated may include predetermined pixel group sizes (e.g., 4, 16, 32, 64, etc.) and the other group sizes may be skipped. Again, in some embodiments, the identified laser pixel groups may be non-overlapping contiguous viable pixel groups. In some embodiments, information related to the identified groups (e.g., laser pixels associated with the different groups) may be stored in non-transitory computer readable memory at 806 for future recall.

Although the embodiment illustrated and described above includes non-overlapping groups of laser pixels, embodiments with overlapping laser pixels are also contemplated. According to one embodiment, the controller may sub-divide the one or more groups of contiguous viable laser pixels into two or more smaller groups of contiguous viable laser pixels wherein at least two of the two or more smaller groups of contiguous viable pixels include at least one laser pixel shared in common. Sub-dividing pixel groups to include shared laser pixels may increase the number of potentially redundant groups available, however the smaller groups may not be fully redundant to each other as they may include at least one laser pixel in common. Should a shared pixel fail, both groups sharing that pixel would also fail. In some embodiments, the selection of overlapping groups with the same number of pixels may be prioritized after identifying redundant groups of laser pixels. In other words, fully redundant groups may be used to form a part prior to selecting or using overlapping groups of a similar size in some embodiments.

After identifying different potential pixel groups, one or more pixel groups of contiguous viable pixels may be selected use during part formation by an additive manufacturing system at 807. One or more groups of contiguous viable laser pixels may be selected for use based on a number of different process parameters as previously described. These parameters may include, but are not limited to one or more of a speed of a printing process (e.g., time to complete a print), a cost of a printing process, energy used in a printing process, process reliability (e.g., increased redundancy from larger numbers of redundant pixel groups), part quality, probability of laser pixel failure, laser pixel alignment, other process parameters disclosed herein, and/or any other appropriate process parameters. In some embodiments, this selection may also include selecting for group sizes corresponding to points of system efficiency. According to some embodiments, the controller may select at least one group of contiguous viable laser pixels based at least in part on a number of redundant pixel groups having an equal number of contiguous viable laser pixels to form same-size redundant groups.

As described previously, the selection of the one or more groups of contiguous viable pixels may be at least partly based on any appropriate process parameter. For example, in some embodiments a weighted function of one or more process parameters. For example, this may be done to select between pixel groups with different group sizes. Additionally, after determining a selected group size for use during a build process, in some embodiments, the redundant pixel groups with group sizes corresponding to the selected group size may be analyzed to determine which should be selected for use. For example, the same weighted function of one or more process parameters may be used to rank the groups in order of the priority of their use (e.g., current pixel group, first redundant pixel group, second redundant pixel group, etc.). Again, the process parameters used to evaluate the different groups may correspond to any of the process parameters disclosed herein. However, in one simple exemplary embodiment, a size and number of redundant groups may be considered. For instance, if a first larger group were identified, but no same-size redundant groups of pixels are found to be available, a set of smaller redundant pixel groups may be selected. The smaller group of pixels may or may not be the next smallest group of pixels depending on the number of redundant groups of pixels for each group size and other considerations including, for example, statistical or historical failure data on the performance of the group or any of the laser pixels included therein. Of course, the use of other process parameters, including those previously described in this disclosure may be used in the selection of the group size and/or specific group for use in a build process as the disclosure is not so limited.

After selecting the one or more groups of contiguous viable pixels for use during part formation, information related to the selected one or more groups of pixels may be stored in non-transitory computer readable memory for subsequent recall in some embodiments at 808. For example, an initial, or currently selected, group may be defined and saved in memory. Additional redundant groups as well as their rankings relative to order of use may also be defined and saved in memory. The information may also include the laser pixels included in each of the separate groups.

While in some embodiments, redundant groups of pixels may be identified for subsequent use in the event of a laser pixel failure, in other embodiments, the above described selection process at 807 may be repeated at any time to select a redundant group of pixels if a laser pixel within the active pixel group should fail.

The above method may be implemented by one or more controllers including at least one processor operatively coupled to the various controllable portions of an additive manufacturing system as disclosed herein. The method may be embodied as computer readable instructions stored on non-transitory computer readable memory associated with the at least one processor such that when executed by the at least one processor the additive manufacturing system, or other appropriate computing device, may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

As noted previously, after selecting a group of contiguous viable laser pixels for use, the selected group may then be used to form one or more parts on a build surface of an additive manufacturing system. According to some embodiments, a different group of pixels (e.g., a redundant group of pixels, or other appropriate group of pixels) of a plurality of identified groups of contiguous viable laser pixels may be used if a failed laser pixel is identified in the selected group of pixels during formation of the one or more parts. In some embodiments the process may switch to a group of laser pixels that are sub-divided from the originally selected group of laser pixels. However, instances in which the process switches to a different group of pixels that is redundant with or otherwise separate from the originally selected group are also contemplated. One possible embodiment of such an implementation is described relative to FIG. 9.

Figure 9:
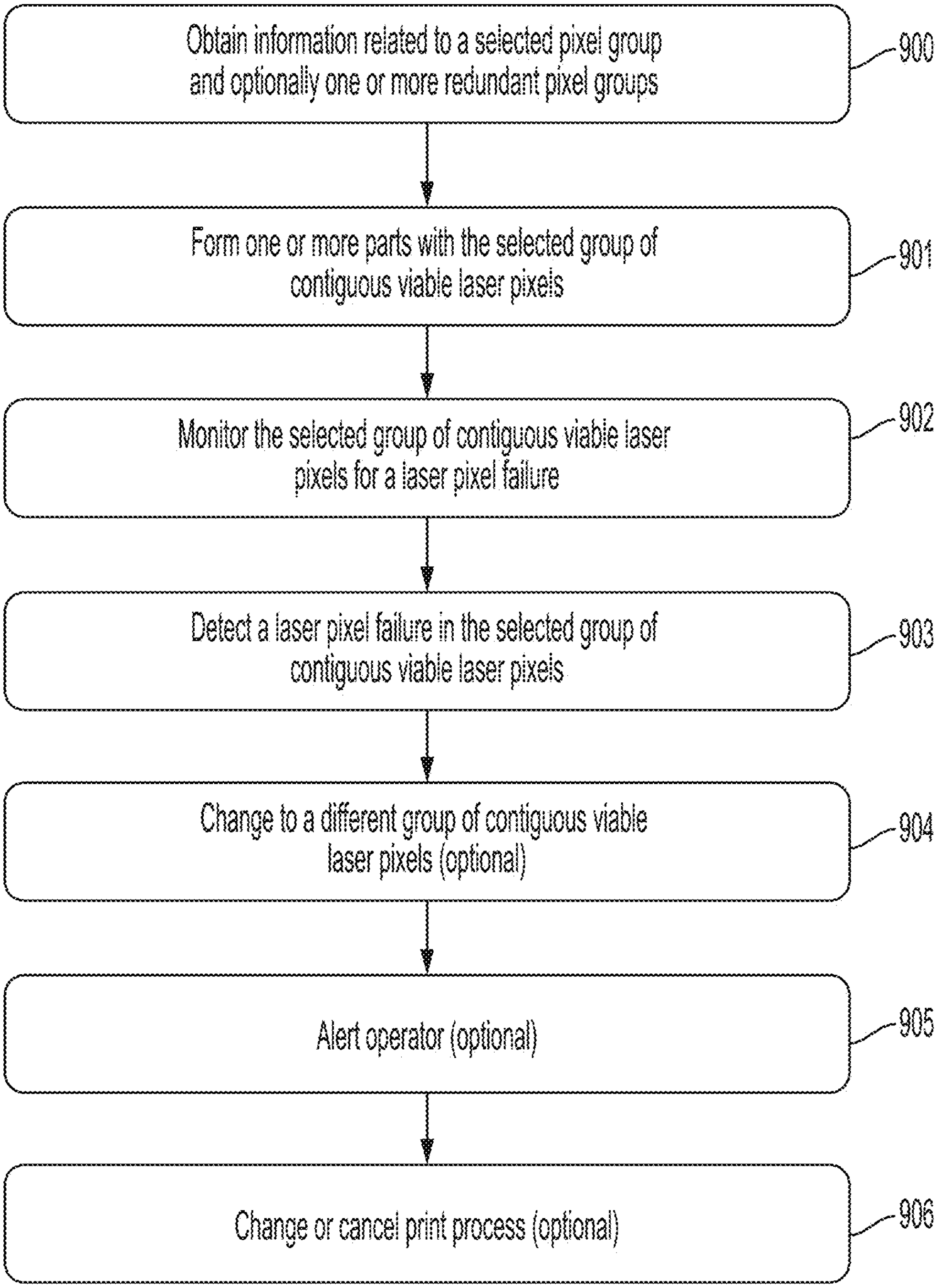
FIG. 9 shows a process diagram for forming parts according to some embodiments.

FIG. 9 depicts a process flow diagram for forming parts in an additive manufacturing system according to some embodiments. One or more pixel groups of contiguous viable laser pixels may have been selected or otherwise obtained prior to the forming process beginning, for instance see the method described relative to FIG. 8. In some embodiments, this may include obtaining information regarding the selected pixel group and optionally one or more redundant pixel groups, see 900. For example, the pixels groups may be selected in real time using any appropriate process or recalled from memory. The formation of one or more parts may be initiated at 901 using the selected pixel group of contiguous viable lasers. As parts are formed, the current selected pixel group of contiguous viable laser pixels, and optionally other groups including redundant groups of laser pixels, may be monitored to detect laser pixel failures at 902. Monitoring of the laser pixel failure may be done using any appropriate method and/or sensor as previously described above. This may include detection of an impending failure before that failure occurs.

If a laser failure is detected in step 903. The additive manufacturing system may then change to a new group of contiguous viable laser pixels 904 that do not include the failed laser pixel. In some embodiments, this may include switching to a previously identified and selected redundant group of pixels and continuing the print. In instances in which alignment offsets between the failed group of pixels and the selected group of pixels is known, for example a calibration and alignment process may have been performed previously as described above, the alignment offset may be used to move the newly selected group of pixels into a printing position to continue the printing process from where the printing process was stop. In some embodiments the new group of pixels may be a smaller group of pixels relative to the failed pixel group and/or the new group of pixels may be a non-calibrated group of pixels. When switching to a smaller group of pixels, new build plans may need to be generated and/or recalled from memory for the newly selected group size. When using a non-calibrated group of pixels it may also be desirable to move the selected group of pixels to a calibration structure and performing a calibration process for the newly selected group of pixels prior to resuming the print. In yet other embodiments, a larger viable group of pixels may exist that was previously not selected for any reason, including lack of redundant groups of pixels of that size. In such cases, the additive manufacturing system may switch to the available larger group as the disclosure is not limited to selecting only same-size or smaller groups when switching between groups.

In some embodiments, the above noted process may be automated where the selection, build process, detection of failed laser pixels, and switch over happen automatically without operator intervention. However, in some embodiments, providing this information to an operator and/or requesting operator input and/or authorization for the switch over may be desirable. Accordingly, in some embodiments, an alert may be output to the operator either prior to or after changing groups. In instances where the system alerts the operator before changing pixel groups, step 905 may come before step 904. For example, the operator may provide input that influences the selection of pixel groups. The system or the operator may change or cancel the print process 906. This may include abandoning some parts while continuing manufacture on other parts. The controller may automatically determine which parts should be abandoned without input from or notice to an operator. However, in some embodiments the operator may influence the selection of parts to be abandoned via any appropriate input.

The above method may be implemented by one or more controllers including at least one processor operatively coupled to the various controllable portions of an additive manufacturing system as disclosed herein. The method may be embodied as computer readable instructions stored on non-transitory computer readable memory associated with the at least one processor such that when executed by the at least one processor the additive manufacturing system may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

Example: Laser Pixel Group Selection and Usage

In one potential example, when using a group of pixels that is a sub-set of a larger group of contiguous laser pixels of count N (for instance N=32) from a larger array of laser pixels of count Y (for instance Y=100) one or more laser pixels may fail to operate in the sub-group of pixels N during the formation of a layer in an additive manufacturing process. In response to the failure, a new subset of laser pixels may be selected from the group of pixels N and called N' (such as where N'=16) to continue the print. However, since N' is smaller than N, the use of fewer than the maximum available contiguous viable laser pixels increases the time needed to complete the print, and leaves the process vulnerable to further delays should N' experience a laser pixel failure. In these situations, it may be advantageous to switch to a different sub-set of laser pixels of count M where M>N'. A group of pixels M may contain laser pixels that were not original in the group of pixels N, the new laser pixels originating from new region of super-set Y. Under these conditions, there may be issues of alignment between the laser groups and the build surface causing banding or other weld/fusion defects that degrade the quality of the print. Misalignment may result from optical and/or mechanical positing, lack of repeatability, or tolerancing. Therefore, if a new group of laser pixels is switched to during a printing process, which in some embodiments may be an overlapping group, it may be desirable to calibrate the newly selected group. This may include, for example, moving the selected group to a calibration structure and performing a calibration as described above to calibrate the new group prior to resuming the printing process.

Example: Laser Pixel Selection Using a Tooling Layer for Calibration Purposes According to some embodiments, one example of laser pixel selection within a tooling layer is described below. An additive manufacturing system comprises a plurality of laser pixels disposed in an array, from this plurality of laser pixels a number are determined to be viable laser pixels. From the viable laser pixels, groups N, M, . . . X may be formed. From within N, M . . . X, certain pixel groups may be determined to be useful for a certain manufacturing process such as for having a certain number of laser pixels, or a certain minimum power or other useful characteristic. These pixel groups may be for example N, M, O, although it should be appreciated that there may be any number of pixel groups including much larger numbers of groups. Next, N, M, O may be prioritized or sorted such as by the number of contiguous viable laser pixels within each group. Other parameters including laser power, beam quality, beam focus, aiming/pointing errors, and/or other parameters may also affect the prioritization of the groups.

The group with the highest priority (e.g., an output from a weighted function) may be selected, for instance group N, and the first layer within the tooling layer is printed with that group. While the layer is printing, process monitoring tools including the one or more weld quality monitors and other process monitoring sensors may be used to determine if any of the laser pixels need adjustment, such as being near or outside of acceptable performance limits. If so, then the laser pixels may be adjusted and the next layer printed with the adjusted group N. If unacceptable or low performance laser pixels remain in group N and are not expected to be made viable by further adjustment, then the group N may be split into one or more smaller viable pixel groups for further testing. For instance, if pixel group N is split, the new group becomes N' where N'<N (there may be more than one sub group from N such as N' and N"). The process may continue iteratively to form acceptable groups from the laser pixels in the original group N. The number of iterations may be weighted against time/layers that could alternatively be spent analyzing and testing of other viable pixel groups such as group M or O.

Proceeding to the next priority group M the process is repeated as for group N. The alignment of the printing with group M is checked with the previous printing group N. If misalignment is detected, printing of group M may be repeated with respect to group N after adjusting M by a calculated machine offset to better align the groups. Printing may be repeated, alternating between pixel groups N and M until convergence of the observed weld offset as formed between the groups has converged to within a desired threshold. If convergence is not achieved after a predetermined number of iterations, group M may be marked as not a viable redundant laser pixel group for pixel group N. The process is iteratively repeated until all groups have been analyzed and found suitable or until the allowable number of tooling layers is reached. At this point, there should be one or more viable groups of lasers pixels that have been optimized for the additive manufacturing process and also one or more redundant groups. A suitable redundant group may be switched into active printing in subsequent layers while producing an acceptable print quality. Printing may be commenced on the first part layer using the pixel groups that have converged to within an acceptable offset from one another. For example, after a current pixel group has failed, the pixel group exhibiting the next lowest weld offset from the current pixel group may be selected for use, and the remaining groups may be ordered for subsequent used based on the previously measured weld offsets or other appropriate metric. The entire process may be automated and controlled by a controller running software on a processor. Thus, operator intervention may be minimized to extreme cases or eliminated entirely in some instances.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device including one or more processors may be embodied in any of a number of forms, such as a rack-mounted computer, a desktop computer, a laptop computer, or a tablet computer. Additionally, in some embodiments, a computing device used to implement the methods disclosed herein may be included as part of the disclosed additive manufacturing systems (e.g., as a controller of the additive manufacturing system), though instances in which the disclosed methods are implemented by a separate computing device that provides an output and/or commands to an additive manufacturing system using the methods disclosed herein are also contemplated. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. An additive manufacturing system comprising:
- a build surface;
- a plurality of laser energy sources;
- an optics assembly configured to direct laser energy from the plurality of laser energy sources toward the build surface to form a corresponding plurality of laser pixels on the build surface; and
- at least one processor configured to:
  - identify viable laser pixels of the plurality of laser pixels based on at least one measured performance metric;
  - identify one or more groups of contiguous viable laser pixels of the viable laser pixels;
  - select a group of the one or more groups of contiguous viable laser pixels; and
  - form one or more parts on the build surface using the selected group of contiguous viable laser pixels.

2. The additive manufacturing system of claim 1, wherein the at least one processor is configured to identify one or more failed laser pixels of the plurality of laser pixels if present.

3. The additive manufacturing system of claim 2, wherein the at least one processor is configured to identify the one or more groups based at least in part on the identified one or more failed laser pixels.

4. The additive manufacturing system of claim 1, wherein the one or more groups of contiguous viable laser pixels is a plurality of groups of contiguous viable laser pixels.

5. The additive manufacturing system of claim 4, wherein the at least one processor is configured to form the one or more parts with a different group of the plurality of groups of contiguous viable laser pixels if a failed laser pixel in the selected group is identified during formation of the one or more parts.

6. The additive manufacturing system of claim 2, wherein the at least one processor is configured to identify the one or more failed laser pixels based at least in part on a failure signal received from one or more of the plurality of laser energy sources.

7. The additive manufacturing system of claim 2, further comprising a weld quality sensor, wherein the at least one processor is configured to identify the one or more failed laser pixels based at least in part on a weld quality measurement of a calibration structure measured with the weld quality sensor.

8. The additive manufacturing system of claim 7, wherein the weld quality sensor is a photosensitive detector.

9. The additive manufacturing system of claim 7, wherein the calibration structure is a tooling layer.

10. The additive manufacturing system of claim 7, wherein the calibration structure is formed during a manufacturing process of the one or more parts.

11. The additive manufacturing system of claim 2, wherein the at least one processor is configured to identify the one or more failed laser pixels based at least in part on a proximity to other failed laser pixels.

12. The additive manufacturing system of claim 2, wherein the at least one processor is configured to identify the one or more failed laser pixels based at least in part on an intensity of the one or more failed laser pixels.

13. The additive manufacturing system of claim 1, wherein the at least one processor is configured to select the group of contiguous viable laser pixels based at least in part on a speed of a printing process.

14. The additive manufacturing system of claim 1, wherein the at least one processor is configured to select the group of contiguous viable laser pixels based at least in part on a number of redundant groups having an equal number of contiguous viable laser pixels.

15. The additive manufacturing system of claim 1, wherein the at least one processor is configured to select the group of contiguous viable laser pixels based at least in part on failure data of the plurality of laser pixels.

16. The additive manufacturing system of claim 1, wherein the at least one processor is configured to select the group of contiguous viable laser pixels based at least in part on one or more process parameters associated with the selected group.

17. The additive manufacturing system of claim 16, wherein the at least one processor is configured to select the group based on a weighting of the one or more process parameters.

18. The additive manufacturing system of claim 1, wherein the one or more groups of contiguous viable laser pixels is a plurality of groups of contiguous viable laser pixels.

19. The additive manufacturing system of claim 18, wherein each group of the plurality of groups have an equal number of contiguous viable laser pixels.

20. The additive manufacturing system of claim 1, wherein the one or more groups of contiguous viable laser pixels include subdivided groups of a larger group of contiguous viable laser pixels.

21. The additive manufacturing system of claim 20, wherein the subdivided groups each contain a unique set of contiguous viable laser pixels.

22. The additive manufacturing system of claim 20, wherein at least two of the subdivided groups include a common laser pixel.

23. The additive manufacturing system of claim 20, wherein the selected group is one of the subdivided groups.

24. A method for operating an additive manufacturing system, the method comprising:
- identifying viable laser pixels of a plurality of laser pixels based on at least one measured performance metric;
- identifying one or more groups of contiguous viable laser pixels of the laser pixels;
- selecting a group of the one or more groups of contiguous viable laser pixels; and
- forming one or more parts on a build surface using the selected group of contiguous viable laser pixels.

25. The method of claim 24, further comprising identifying one or more failed laser pixels.

26. The method of claim 25, wherein identifying the one or more groups is based at least in part on the identified one or more failed laser pixels.

27. The method of claim 24, wherein the one or more groups of contiguous viable laser pixels is a plurality of groups of contiguous viable laser pixels.

28. The method of claim 27, further comprising forming the one or more parts with a different group of the plurality of groups of contiguous viable laser pixels if a failed laser pixel in the selected group is identified during formation of the one or more parts.

29. The method of claim 25, further comprising receiving a failure signal from one or more laser energy sources to identify the one or more failed laser pixels.

30. The method of claim 25, further comprising measuring a weld quality of welds formed by one or more of the plurality of laser pixels during formation of a calibration structure to identify the one or more failed laser pixels.

31. The method of claim 30, wherein the calibration structure is a tooling layer.

32. The method of claim 30, wherein the calibration structure is formed during a manufacturing process of the one of more parts.

33. The method of claim 25, wherein identifying the one or more failed laser pixels is based at least in part on a proximity to other failed laser pixels.

34. The method of claim 25, wherein identifying the one or more failed laser pixels is based at least in part on an intensity of the one or more failed laser pixels.

35. The method of claim 24, wherein selecting the group of contiguous viable laser pixels is based at least in part on a speed of a printing process.

36. The method of claim 24, wherein selecting the group of contiguous viable laser pixels is based at least in part on a number of redundant groups having an equal number of contiguous viable laser pixels.

37. The method of claim 24, wherein selecting the group of contiguous viable laser pixels is based at least in part on failure data of the plurality of laser pixels.

38. The method of claim 24, wherein selecting the group of contiguous viable laser pixels is based at least in part on one or more process parameters associated with the selected group.

39. The method of claim 38, wherein selecting the group is based on a weighting of the one or more process parameters.

40. The method of claim 24, wherein the one or more groups of contiguous viable laser pixels is a plurality of groups of contiguous viable laser pixels.

41. The method of claim 40, wherein each group of the plurality of groups have an equal number of contiguous viable laser pixels.

42. The method of claim 24, wherein identifying the one or more groups of contiguous viable laser pixels includes subdividing a larger group of contiguous viable laser pixels into subdivided groups of contiguous viable laser pixels.

43. The method of claim 42, wherein the subdivided groups each contain a unique set of contiguous viable laser pixels.

44. The method of claim 42, wherein at least two of the subdivided groups include a common laser pixel.

45. The method of claim 42, wherein the selected group is one of the subdivided groups.

46. A non-transitory computer readable medium including processor executable instructions that, when executed by one or more processors, perform a method comprising:

identifying viable laser pixels of a plurality of laser pixels based on at least one measured performance metric;

identifying one or more groups of contiguous viable laser pixels of a plurality of laser pixels;

selecting a group of the one or more groups of contiguous viable laser pixels; and forming one or more parts on a build surface using the selected group of contiguous viable laser pixels.

47. The additive manufacturing system of claim 1, wherein the measured performance metric is a statistical life of a pixel of the plurality of pixels.

48. The additive manufacturing system of claim 1, wherein the measured performance metric is a proximity of a pixel of the plurality of pixels to a failed pixel.

49. The additive manufacturing system of claim 1, wherein the measured performance metric is a weld quality of a part formed by a pixel of the plurality of pixels.

50. The additive manufacturing system of claim 1, wherein the measured performance metric is a laser intensity of a pixel of the plurality of pixels.

* * * * *